United States Patent
Featonby et al.

(10) Patent No.: US 10,482,561 B1
(45) Date of Patent: Nov. 19, 2019

(54) INTERACTION MONITORING FOR VIRTUALIZED GRAPHICS PROCESSING

(71) Applicant: Amazon Technologies, Inc., Seattle, WA (US)

(72) Inventors: Malcolm Featonby, Sammamish, WA (US); Yuxuan Liu, Seattle, WA (US); Umesh Chandani, Seattle, WA (US); John Merrill Phillips, Jr., Seattle, WA (US); Adithya Bhat, Seattle, WA (US); Douglas Cotton Kurtz, Sammamish, WA (US); Mihir Sadruddin Surani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/404,131

(22) Filed: Jan. 11, 2017

(51) Int. Cl.
*G06T 1/00* (2006.01)
*G06T 1/20* (2006.01)
(Continued)

(52) U.S. Cl.
CPC .......... *G06T 1/20* (2013.01); *H04L 41/0686* (2013.01); *H04L 67/42* (2013.01);
(Continued)

(58) Field of Classification Search
CPC ......... G06F 9/45533; G06F 2009/4557; G06F 9/45537; G06F 2212/152; G06F 9/50;
(Continued)

(56) References Cited

U.S. PATENT DOCUMENTS

| 9,069,622 | B2 | 6/2015 | Post et al. |
| 9,098,323 | B2 | 8/2015 | Mitra et al. |

(Continued)

FOREIGN PATENT DOCUMENTS

WO    2014100558    6/2014

OTHER PUBLICATIONS

Nice, "DCV Administration Guide," Nice s.r.l, Asti, Italy, Jul. 2015, Source: https://www.nice-software.com/download/nice-dcv-2014#documentation, pp. 1-96.
(Continued)

*Primary Examiner* — Hau H Nguyen
(74) *Attorney, Agent, or Firm* — Robert C. Kowert; Meyertons, Hood, Kivlin, Kowert & Goetzel, P.C.

(57) ABSTRACT

Methods, systems, and computer-readable media for interaction monitoring for virtualized graphics processing are disclosed. Execution of an application is initiated on a virtual compute instance that is implemented using CPU and memory resources of a server. Instruction calls are produced by the execution of the application and sent from the server to a graphics server over a network. The graphics server comprises a physical GPU, and a virtual GPU is implemented using the physical GPU and attached to the virtual compute instance. GPU output is generated at the graphics server based at least in part on execution of the instruction calls using the virtual GPU. A log of interactions between the application and the virtual GPU is stored. The interactions comprise the instruction calls sent to the graphics server and responses to the instruction calls sent to the virtual compute instance.

19 Claims, 13 Drawing Sheets

(51) Int. Cl.
*H04L 29/06* (2006.01)
*H04L 12/24* (2006.01)
*H04L 29/08* (2006.01)

(52) U.S. Cl.
CPC .......... *G06T 2200/16* (2013.01); *H04L 67/10* (2013.01); *H04L 67/1097* (2013.01)

(58) Field of Classification Search
CPC .... G06T 1/20; G09G 5/363; G09G 2370/022; G09G 5/006
See application file for complete search history.

(56) References Cited

U.S. PATENT DOCUMENTS

| | | |
|---|---|---|
| 2011/0083131 A1 | 4/2011 | Pirzada et al. |
| 2012/0069032 A1 | 3/2012 | Hansson et al. |
| 2012/0154389 A1 | 6/2012 | Bohan et al. |
| 2014/0055466 A1 | 2/2014 | Petrov et al. |
| 2014/0176583 A1 | 6/2014 | Abiezzi et al. |
| 2014/0181806 A1 | 6/2014 | Abiezzi et al. |
| 2014/0215462 A1 | 7/2014 | Kuo et al. |
| 2014/0286390 A1 | 9/2014 | Fear |
| 2015/0067672 A1 | 3/2015 | Mitra et al. |
| 2015/0097844 A1 | 4/2015 | Wankhede et al. |
| 2015/0116335 A1 | 4/2015 | Chen et al. |
| 2015/0220354 A1 | 8/2015 | Nair |
| 2016/0071481 A1* | 3/2016 | Chakraborty ........... G06F 9/455 345/520 |
| 2016/0247248 A1 | 8/2016 | Ha et al. |
| 2017/0004808 A1 | 1/2017 | Agashe et al. |

OTHER PUBLICATIONS

Federico Silla "The rCUDA technology: an inexpensive way to improve the performance of GPU-based clusters." Talk at Computer Engineering Laboratory, Delft University of Technology. Delft, Netherlands. Apr. 2015, pp. 1-47.

U.S. Appl. No. 14/938,457, filed Nov. 11, 2015, Nicholas Patrick Wilt et al.

U.S. Appl. No. 14/938,461, filed Nov. 11, 2015, Nicholas Patrick Wilt et al.

U.S. Appl. No. 14/938,656, filed Nov. 11, 2015, Nicholas Patrick Wilt et al.

U.S. Appl. No. 14/938,654, filed Nov. 11, 2015, Nicholas Patrick Wilt et al.

U.S. Appl. No. 15/177,255, filed Jun. 8, 2016, Nicholas Patrick Wilt.

U.S. Appl. No. 15/177,262, filed Jun. 8, 2016, Nicholas Patrick Wilt.

Jeff Weiss, et al., "NVIDIA Grid VCPU Deployment Guide for VmWare Horizon 6.1", NVIDIA TechPub, Mar. 1, 2015, Retrieved from URL: http://www.vmware.com/content/dam/digitalmarketing/vmware/en/pdf/products/horizon/grid-vgpu-deployement-guide.pdf, pp. 1-14.

U.S. Appl. No. 14/822,511, filed Aug. 10, 2015, Nicholas Patrick Wilt, et al.

Antonio J. Pena, et al., "A Complete and Efficient CUDA-Sharing Solution for HPC Clusters", Sep. 2, 2014, Retrieved from the Internet: URL: http://www.mcs.anl.gov/papers/P5137-0514.pdf, pp. 1-28.

Lin Shi, et al., "vCUDA: GPU-Accelerated High-Performance Computing in Virtual Machines", IEEE Transaction on Computers, vol. 61, No. 6, Jun. 2012, pp. 804-816.

Matthew Danish, et al., "Virtual-CPU Scheduling in the Quest Operating System", 2011 17th IEEE Real-Time and Embedded Technology and Application Symposium, Apr. 11, 2011, pp. 169-179.

Mark Panahi, et al., "A Framework for Real-Time Service-Oriented Architecture", 2009 IEEE Conference on Commerce and Enterprise Computing (CED '09), Jul. 20, 2009, pp. 460-467.

Marcos D. Assuncao, et al., "CloudAffinity: A Framework for Matching Servers to Cloudmates", 2012 IEEE Network Operations and Management Symposium (NOMS 2012), Apr. 16-20, 2012, pp. 213-220.

Shinpei Kato, et al., "Gdev: First-Class GPU Resource Management in the Operating System", Jun. 1, 2012, Retrieved from URL: https://www.usenix.org/system/files/conference/atc12/atc12-final1319.pdf, pp. 1-12.

U.S. Appl. No. 15/178,292, filed Jun. 9, 2016, Nicholas Patrick Wilt.

U.S. Appl. No. 15/409,482, filed Jan. 18, 2017, Malcolm Featonby, et al.

* cited by examiner

INTERACTION MONITORING FOR VIRTUALIZED GRAPHICS PROCESSING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner.

Figure 1:
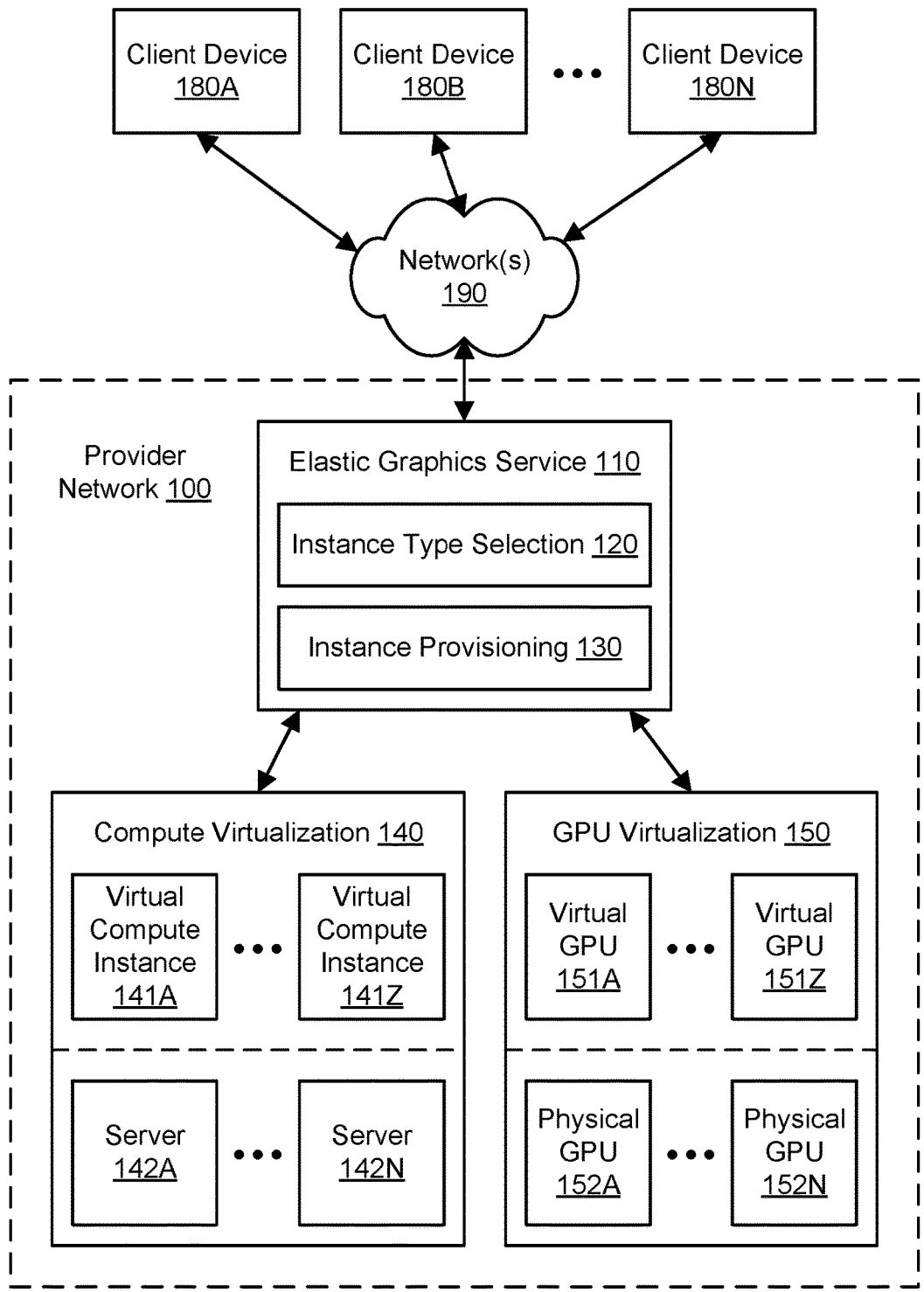
FIG. 1 illustrates an example system environment for virtualizing graphics processing in a provider network, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for interaction monitoring for virtualized graphics processing are described. Using the techniques described herein, a virtual compute instance may be provisioned, and a virtual graphics processing unit (GPU) may be attached to the instance to provide virtualized graphics processing. A server (e.g., a physical compute instance) that implements the virtual compute instance may communicate over a network with a graphics server that includes a physical GPU used to implement the virtual GPU. The virtual compute instance may be configured to execute one or more applications that take advantage of the virtualized graphics processing provided by the virtual GPU. In executing a particular application, the virtual compute instance may send instruction calls (e.g., associated with a graphics API or GPU computing API) to the graphics server, and output of the virtual GPU may be generated based (at least in part) on execution of the instruction calls. Interactions between the application and the virtual GPU may be monitored, and the instruction calls as well as any responses to the calls may be stored in a log. Using a profiling service, the log of interactions may be analyzed at any suitable point in time. Based on analysis of the log, metrics or other analytics may be generated and reported to a client, such as a vendor of the application. For example, the metrics or analytics may indicate the latency of various interactions over the network and/or the distribution of various operations associated with the instruction calls. Based on analysis of the log, a recommendation of potential performance optimizations to the application may be generated and reported to a vendor of the application. If the application is modified based on the analysis, then interactions between the modified application and a virtual GPU may again be monitored and analyzed, e.g., to determine any differences in performance. The interactions in the log may be replayed, e.g., using a virtual GPU with different characteristics than the original virtual GPU, and a log of the replay may also be analyzed by the profiling service. In one embodiment, the log may be stored and analyzed with permission of a vendor of the application. Using these techniques, analytics regarding the use of a virtual GPU by an application may be generated and potentially used for modification of the application to improve its performance.

Virtualized Graphics Processing in a Provider Network

FIG. 1 illustrates an example system environment for virtualizing graphics processing in a provider network, according to one embodiment. Clients of a provider network 100 may use computing devices such as client devices 180A-180N to access an elastic graphics service 110 and other resources offered by the provider network. The client devices 180A-180N may be coupled to the provider network 100 via one or more networks 190. The provider network 100 may provide compute virtualization 140 such that a plurality of virtual compute instances 141A-141Z may be implemented using a plurality of servers 142A-142N. The virtual compute instances 141A-141Z may also be referred to herein as virtual machines (VMs). Similarly, the provider network 100 may provide GPU virtualization 150 such that a plurality of virtual GPUs 151A-151Z may be implemented using a plurality of physical GPUs 152A-152N. An example hardware architecture for implementing virtual GPUs using physical GPUs is discussed with reference to FIG. 5. The underlying servers 142A-142N may be heterogeneous, and the underlying physical GPUs 152A-152N may be heterogeneous as well. The servers may also be referred to as physical compute instances. In one embodiment, the compute virtualization 140 may use techniques for multi-tenancy to provision virtual compute instances 141A-141Z that exceed the servers 142A-142N in number. In one embodiment, the GPU virtualization 150 may use techniques for multi-tenancy to provision virtual GPUs 151A-151Z that exceed the physical GPUs 152A-152N in number.

The elastic graphics service 110 may offer, to clients, selection and provisioning of virtualized compute instances with attached virtualized GPUs. Accordingly, the elastic graphics service 110 may include an instance type selection functionality 120 and an instance provisioning functionality 130. In one embodiment, the provider network 100 may offer virtual compute instances 141A-141Z with varying computational and/or memory resources. In one embodiment, each of the virtual compute instances 141A-141Z may correspond to one of several instance types. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, an instance type may be selected for a client, e.g., based (at least in part) on input from the client. For example, a client may choose an instance type from a predefined set of instance types. As another example, a client may specify the desired resources of an instance type, and the instance type selection functionality 120 may select an instance type based on such a specification.

In one embodiment, the provider network 100 may offer virtual GPUs 151A-151Z with varying graphics processing capabilities. In one embodiment, each of the virtual GPUs 151A-151Z may correspond to one of several virtual GPU classes. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, a virtual GPU class may be selected for a client, e.g., based (at least in part) on input from the client. For example, a client may choose a virtual GPU class from a predefined set of virtual GPU classes. As another example, a client may specify the desired resources of a virtual GPU class, and the instance type selection functionality 120 may select a virtual GPU class based on such a specification.

Therefore, using the instance type selection functionality 120, clients (e.g., using client devices 180A-180N) may specify requirements for virtual compute instances and virtual GPUs. The instance provisioning functionality 130 may provision virtual compute instances with attached virtual GPUs based on the specified requirements (including any specified instance types and virtual GPU classes). As used herein, provisioning a virtual compute instance generally includes reserving resources (e.g., computational and memory resources) of an underlying server for the client (e.g., from a pool of available servers and other resources), installing or launching required software (e.g., an operating system), and making the virtual compute instance available to the client for performing tasks specified by the client. For a particular client, a virtual compute instance may be provisioned of the instance type selected by or for the client, and the virtual compute instance may be provisioned with an attached virtual GPU of the GPU class selected by or for the client. In one embodiment, a virtual GPU of substantially any virtual GPU class may be attached to a virtual compute instance of substantially any instance type.

The provider network 100 may be set up by an entity such as a company or a public sector organization to provide one or more services (such as various types of cloud-based computing or storage) accessible via the Internet and/or other networks to client devices 180A-180N. Provider network 100 may include numerous data centers hosting various resource pools, such as collections of physical and/or virtualized computer servers, storage devices, networking equipment and the like (e.g., implemented using computing system 3000 described below with regard to FIG. 12), needed to implement and distribute the infrastructure and services offered by the provider network 100. In some embodiments, provider network 100 may provide computing resources, such as compute virtualization service 140 and GPU virtualization service 150; storage services, such as a block-based storage service, key-value based data stores, or various types of database systems; and/or any other type of network-based services. Client devices 180A-180N may access these various services offered by provider network 100 via network(s) 190. Likewise, network-based services may themselves communicate and/or make use of one another to provide different services. For example, computing resources offered to client devices 180A-180N in units called "instances," such as virtual or servers or storage instances, may make use of particular data volumes, providing virtual block storage for the compute instances. The provider network 100 may implement or provide a multi-tenant environment such that multiple clients (e.g., using client devices 180A-180N) may access or use a particular resource in a substantially simultaneous manner.

As noted above, compute virtualization service 140 may offer various virtual compute instances 141A-141Z to client devices 180A-180N. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of the compute virtualization service 140 in different embodiments, including general purpose or special purpose computer servers, storage devices, network devices and the like. In some embodiments, client devices 180A-180N or other any other user may be configured (and/or authorized) to direct network traffic to a virtual compute instance. In various embodiments, virtual compute instances 141A-141Z may attach or map to one or more data volumes provided by a storage service in order to obtain persistent storage for performing various operations. Using the techniques described herein, virtual GPUs 151A-151Z may be attached to virtual compute instances 141A-141Z to provide graphics processing for the virtual compute instances.

Virtual compute instances 141A-141Z may operate or implement a variety of different platforms, such as application server instances, Java™ virtual machines (JVMs) or other virtual machines, general purpose or special-purpose operating systems, platforms that support various interpreted or compiled programming languages such as Ruby, Perl, Python, C, C++ and the like, or high-performance computing platforms) suitable for performing client applications, without for example requiring the client devices 180A-180N to access an instance. In some embodiments, virtual compute instances 141A-141Z may have different instance types or configurations based on expected uptime ratios. The uptime ratio of a particular virtual compute instance may be defined as the ratio of the amount of time the instance is activated to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and the client may pay a discounted hourly usage fee in accordance with the associated pricing policy. If the client expects to have a steady-state workload that requires an instance to be up most of the time, then the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Virtual compute instance configurations may also include virtual compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). In some embodiments, particular instance types for virtual compute instances may be associated with default classes for virtual GPUs. For example, some instance types may be configured without a virtual GPU as a default configuration, while other instance types designated for graphics intensive workloads may be designated with particular virtual GPU classes as a default configuration. Configurations of virtual compute instances may also include their location in a particular data center or availability zone, geographic location, and (in the case of reserved compute instances) reservation term length.

The client devices 180A-180N may represent or correspond to various clients or users of the provider network 100, such as customers who seek to use services offered by the provider network. The clients, users, or customers may represent persons, businesses, other organizations, and/or other entities. The client devices 180A-180N may be distributed over any suitable locations or regions. Each of the client devices 180A-180N may be implemented using one or more computing devices, any of which may be implemented by the example computing device 3000 illustrated in FIG. 12.

The client devices 180A-180N may encompass any type of client configurable to submit requests to provider network 100. For example, a given client device may include a suitable version of a web browser, or it may include a plug-in module or other type of code module configured to execute as an extension to or within an execution environment provided by a web browser. Alternatively, a client device may encompass an application such as a database application (or user interface thereof), a media application, an office application, or any other application that may make use of virtual compute instances, storage volumes, or other network-based services in provider network 100 to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, client devices 180A-180N may be configured to generate network-based service requests according to a Representational State Transfer (REST)-style network-based services architecture, a document- or message-based network-based services architecture, or another suitable network-based services architecture. In some embodiments, client devices 180A-180N (e.g., a computational client) may be configured to provide access to a virtual compute instance in a manner that is transparent to applications implement on the client device utilizing computational resources provided by the virtual compute instance. In at least some embodiments, client devices 180A-180N may provision, mount, and configure storage volumes implemented at storage services for file systems implemented at the client devices.

Client devices 180A-180N may convey network-based service requests to provider network 100 via external network(s) 190. In various embodiments, external network(s) 190 may encompass any suitable combination of networking hardware and protocols necessary to establish network-based communications between client devices 180A-180N and provider network 100. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. For example, both a given client device and the provider network 100 may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the provider network 100. It is noted that in some embodiments, client devices 180A-180N may communicate with provider network 100 using a private network rather than the public Internet.

Figure 12:
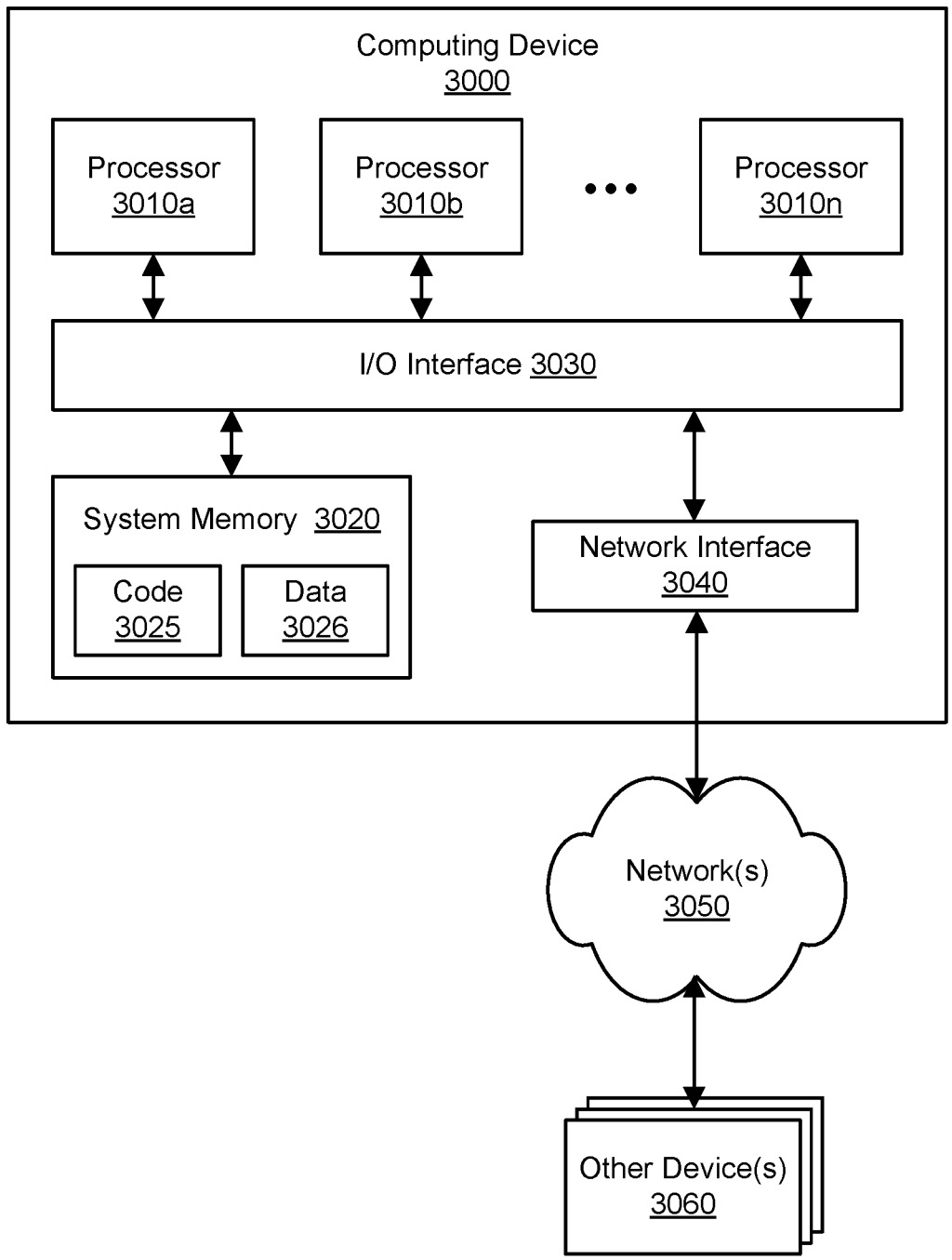
FIG. 12 illustrates an example computing device that may be used in some embodiments.

The provider network 100 may include a plurality of computing devices, any of which may be implemented by the example computing device 3000 illustrated in FIG. 12. In various embodiments, portions of the described functionality of the provider network 100 may be provided by the same computing device or by any suitable number of different computing devices. If any of the components of the provider network 100 are implemented using different computing devices, then the components and their respective computing devices may be communicatively coupled, e.g., via a network. Each of the illustrated components (such as the elastic graphics service 110 and its constituent functionalities 120 and 130) may represent any combination of software and hardware usable to perform their respective functions.

It is contemplated that the provider network 100 may include additional components not shown, fewer components than shown, or different combinations, configurations, or quantities of the components shown. For example, although servers 142A through 142N are shown for purposes of example and illustration, it is contemplated that different quantities and configurations of servers may be used. Similarly, although physical GPUs 152A through 152N are shown for purposes of example and illustration, it is contemplated that different quantities and configurations of physical GPUs may be used. Additionally, although three client devices 180A, 180B, and 180N are shown for purposes of example and illustration, it is contemplated that different quantities and configurations of client devices may be used. Aspects of the functionality described herein for providing virtualized graphics processing may be performed, at least in part, by components outside of the provider network 100.

Figure 2A:
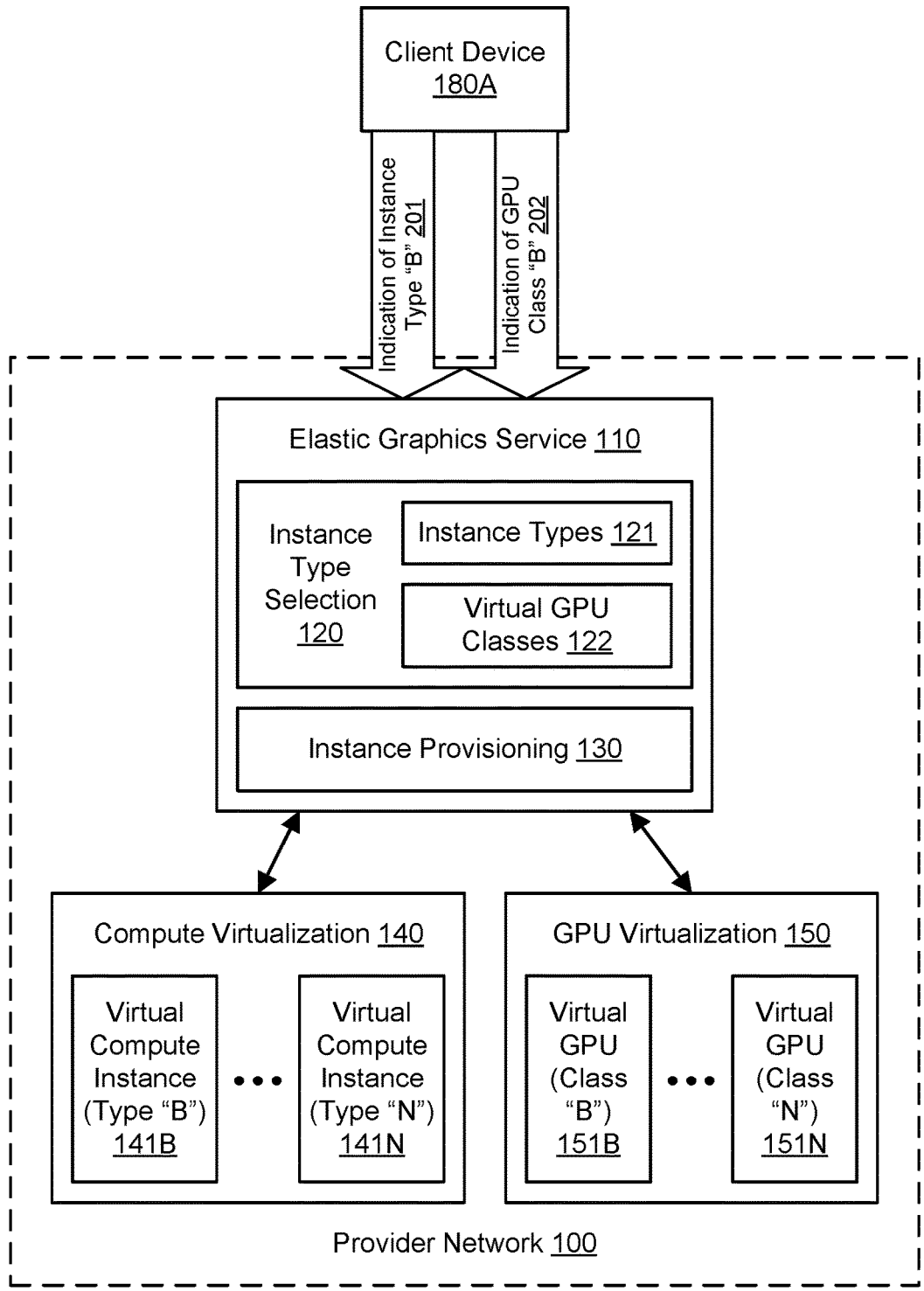
FIG. 2A illustrates further aspects of the example system environment for virtualizing graphics processing in a provider network, including selection of an instance type and virtual GPU class for a virtual compute instance with an attached virtual GPU, according to one embodiment.

FIG. 2A illustrates further aspects of the example system environment for virtualizing graphics processing in a provider network, including selection of an instance type and virtual GPU class for a virtual compute instance with an attached virtual GPU, according to one embodiment. As discussed above, the provider network 100 may offer to the client device 180A a plurality of instance types 121 for virtual compute instances. As shown for purposes of illustration and example, virtual compute instances of type "B" 141B through type "N" 141N may be offered. However, it is contemplated that any suitable number and configuration of virtual compute instance types may be offered to clients by the provider network 100. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, the client device 180A may provide an indication, specification, or other selection 201 of a particular instance type. For example, a client may choose or the instance type "B" from a predefined set of instance types using input 201. As another example, a client may specify the desired resources of an instance type using input 201, and the instance type selection functionality 120 may select the instance type "B" based on such a specification. Accordingly, the virtual compute instance type may be selected by the client or on behalf of the client, e.g., using the instance type selection functionality 120.

As discussed above, the provider network 100 may offer to the client device 180A a plurality of virtual GPU classes 122 for virtual GPUs. As shown for purposes of illustration and example, virtual GPUs of class "B" 151B through class "N" 151N may be offered. However, it is contemplated that any suitable number and configuration of virtual GPU classes may be offered to clients by the provider network 100. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, the client device 180A may provide an indication, specification, or other selection 202 of a particular virtual GPU class. For example, a client may choose the virtual GPU class "B" from a predefined set of virtual GPU classes using input 202. As another example, a client may specify the desired resources of a virtual GPU class using input 202, and the instance type selection functionality 120 may select the virtual GPU class "B" based on such a specification. Accordingly, the virtual GPU class may be selected by the client or on behalf of the client, e.g., using the instance type selection functionality 120.

Figure 2B:
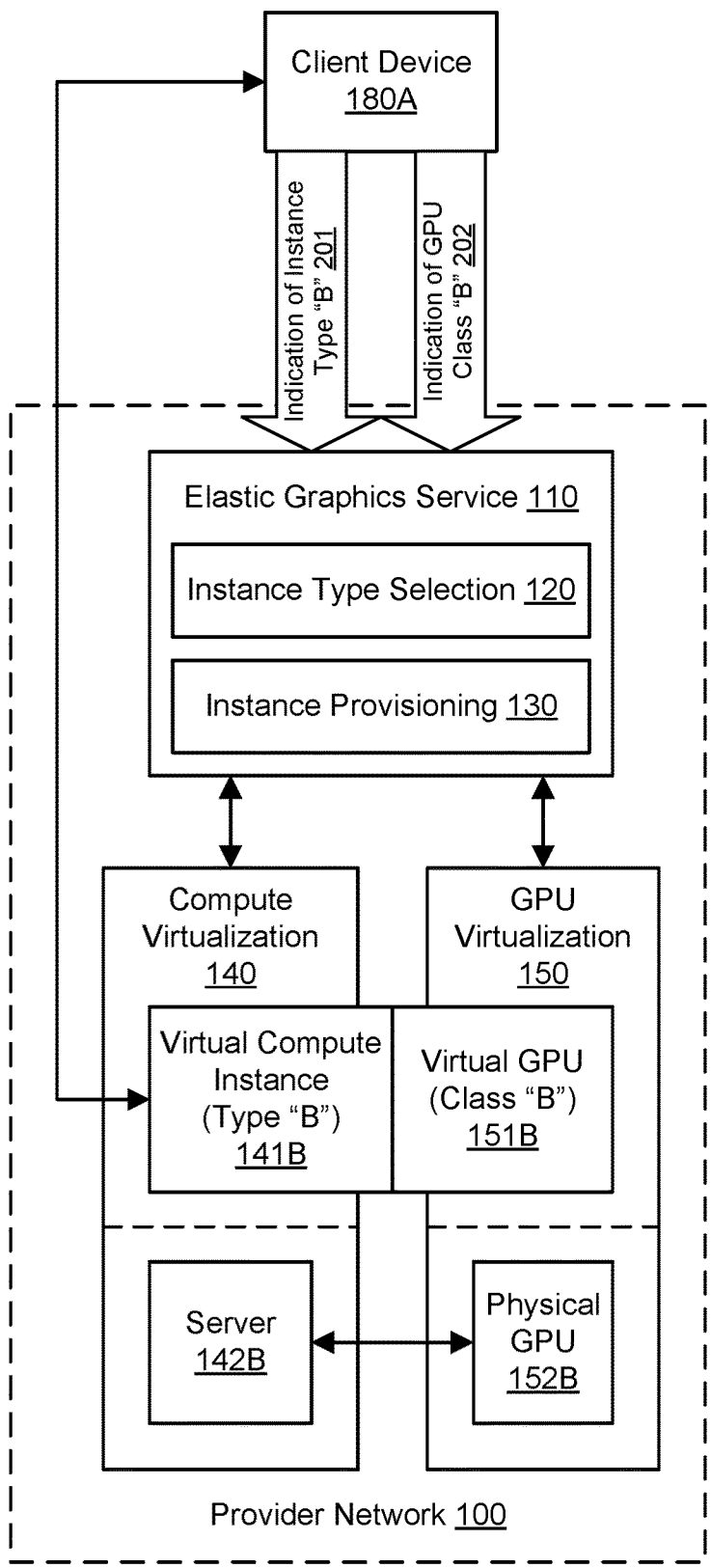
FIG. 2B illustrates further aspects of the example system environment for virtualizing graphics processing in a provider network, including provisioning of a virtual compute instance with an attached virtual GPU, according to one embodiment.

FIG. 2B illustrates further aspects of the example system environment for virtualizing graphics processing in a provider network, including provisioning of a virtual compute instance with an attached virtual GPU, according to one embodiment. The instance provisioning functionality 130 may provision a virtual compute instance 141B with an attached virtual GPU 151B based on the specified instance type "B" and the specified virtual GPU class "B". The provisioned virtual compute instance 141B may be implemented by the compute virtualization functionality 140 using suitable physical resources such as a server 142B, and the provisioned virtual GPU 151B may be implemented by the GPU virtualization functionality 150 using suitable physical resources such as a physical GPU 152B. As used herein, provisioning a virtual compute instance generally includes reserving resources (e.g., computational and memory resources) of an underlying server for the client (e.g., from a pool of available servers and other resources), installing or launching required software (e.g., an operating system), and making the virtual compute instance available to the client for performing tasks specified by the client. In one embodiment, a virtual GPU of substantially any virtual GPU class may be attached to a virtual compute instance of substantially any instance type. To implement the virtual compute instance 141B with the attached virtual GPU 151B, a server 142B may communicate with a physical GPU 152B, e.g., over a network. The physical GPU 152B may be located in a different computing device than the server 142B. Even though they may be implemented using separate hardware, the virtual GPU 151B may be said to be attached to the virtual compute instance 141B, or the virtual compute instance may be said to include the virtual GPU. The virtual GPU 151B may be installed on a device that may reside in various locations relative to the physical GPU 152B, e.g., on the same rack, the same switch, the same room, and/or other suitable locations on the same network. A vendor of the physical GPU 152B may be hidden from the client device 180A.

Figure 3:
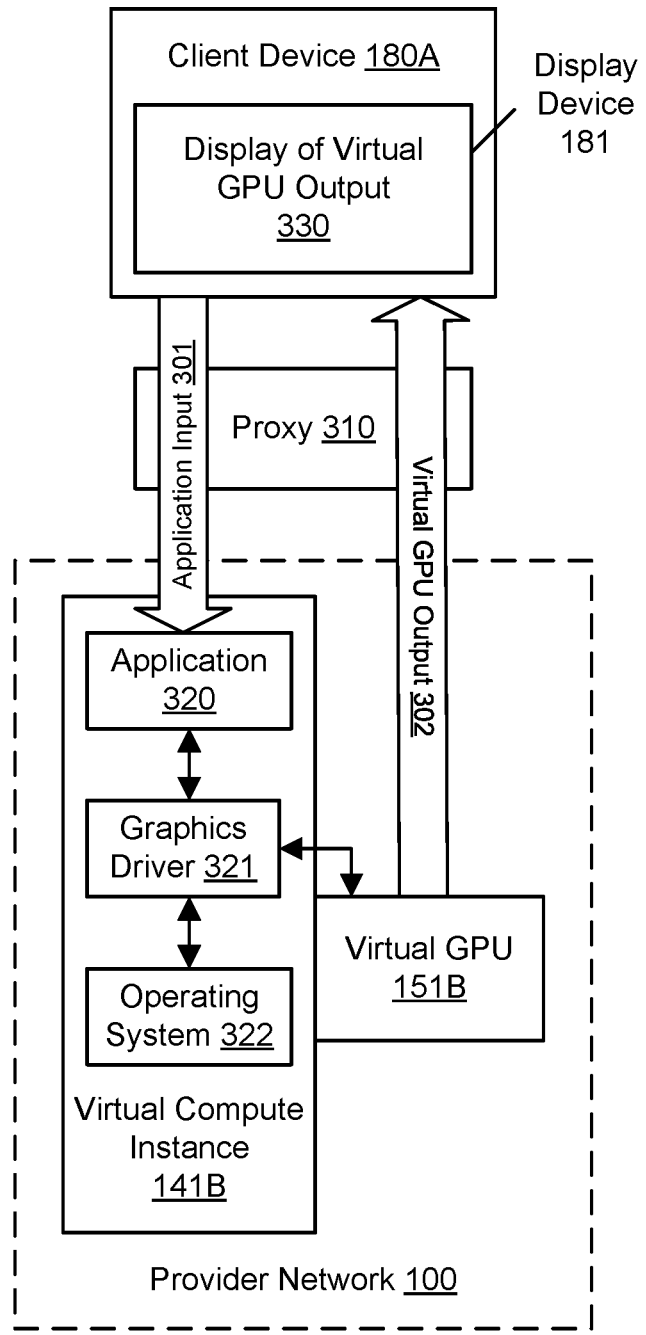
FIG. 3 illustrates the use of a virtual compute instance with a virtual GPU to generate virtual GPU output for display on a client device, according to one embodiment.

FIG. 3 illustrates the use of a virtual compute instance with a virtual GPU to generate virtual GPU output for display on a client device, according to one embodiment. After the virtual compute instance 141B is provisioned with the attached virtual GPU 151B, the client device 180A may use the provisioned instance and virtual GPU to perform any suitable tasks, e.g., based on input from the client device. The virtual compute instance 141B may execute a particular application 320. The application 320 may be selected or provided by the client. The virtual compute instance 141B may also be configured with a particular operating system 322 that provides support for the application 321. Additionally, the virtual compute instance 141B may be configured with a particular graphics driver 321. The graphics driver 321 may interact with the virtual GPU 151B to provide graphics processing for the application 320, including accelerated two-dimensional graphics processing and/or accelerated three-dimensional graphics processing. In one embodiment, the graphics driver 321 may implement a graphics application programming interface (API) such as Direct3D or OpenGL. The graphics driver 321 may represent components running in user mode and/or kernel mode. Additional components (not shown), such as a graphics runtime, may also be used to provide accelerated graphics processing on the virtual compute instance 141B.

The client device 180A may communicate with the virtual compute instance 141B through a proxy 310. Various other communications may be sent through the proxy 310, including for example virtual GPU output 302 from the virtual GPU 151B to the client device 180A. Use of the proxy 310 may hide the address of the virtual compute instance and any associated resources (including a computing device that implements the virtual GPU 151B) from the client device 180A. The proxy 310 and virtual compute instance 141B may communicate using a suitable remoting protocol. In various embodiments, the proxy 310 may or may not be part of the provider network 100. The client device 180A may provide application input 301 to the application 320 running on the virtual compute instance 141B. For example, the application input 301 may include data to be operated upon by the application 320 and/or instructions to control the execution of the application.

Using the graphics processing provided by the virtual GPU 151B, execution of the application may generate virtual GPU output 302. The virtual GPU output 302 may be provided to the client device 180A, e.g., from the virtual GPU 151B or virtual compute instance 141B. In one embodiment, the virtual GPU output 302 may be sent from the virtual GPU 151B (e.g., from a computing device that includes the virtual GPU) to the client device 180A while bypassing the rest of the virtual compute instance 141B (e.g., the underlying server 142B). The virtual GPU output 302 may also be sent to the client device 180A through the proxy 310. The proxy 310 and virtual GPU 151B may communicate using a suitable remoting protocol. In one embodiment, the virtual GPU output 302 may be returned to the virtual compute instance 141B, and the virtual compute instance may send the virtual GPU output to the client device 180A. In one embodiment, the client device 180A may forward the virtual GPU output 302 to another component.

In one embodiment, a display device 181 associated with the client device 180A may present a display 330 of the virtual GPU output 302. In one embodiment, the virtual GPU output 302 may include pixel data, image data, video data, or other graphical data. In one embodiment, the virtual GPU output 302 may drive a full-screen display on the display device 181. Portions of the virtual GPU output 302 may be streamed to the client device 180A over time. In one embodiment, the virtual GPU output 302 may be composited with one or more other sources of graphical data to produce the display 330. In one embodiment, the virtual GPU 151B may be used for general-purpose computing (e.g., GPGPU computing), and the virtual GPU output 302 may not include pixel data or other graphical data. In various embodiments, the client device 180A may process or transform all or part of the virtual GPU output 302 before displaying the output. For example, a CPU, GPU, or co-processor on the client device 180A may transform portions of the virtual GPU output 302 and display the results on the display device 181.

In various embodiments, any suitable technique(s) may be used to offload graphics processing from a virtual compute instance to a physical GPU. In one embodiment, an API shim may intercept calls to a graphics API and marshal the calls over a network to an external computing device that includes a physical GPU. In one embodiment, a driver shim may surface a proprietary driver to the virtual compute instance, intercept calls, and marshal the calls over a network to an external computing device that includes a physical GPU. In one embodiment, a hardware shim may surface a hardware interface to the virtual compute instance and marshal attempts by the instance to interact with the physical GPU.

Figure 4:
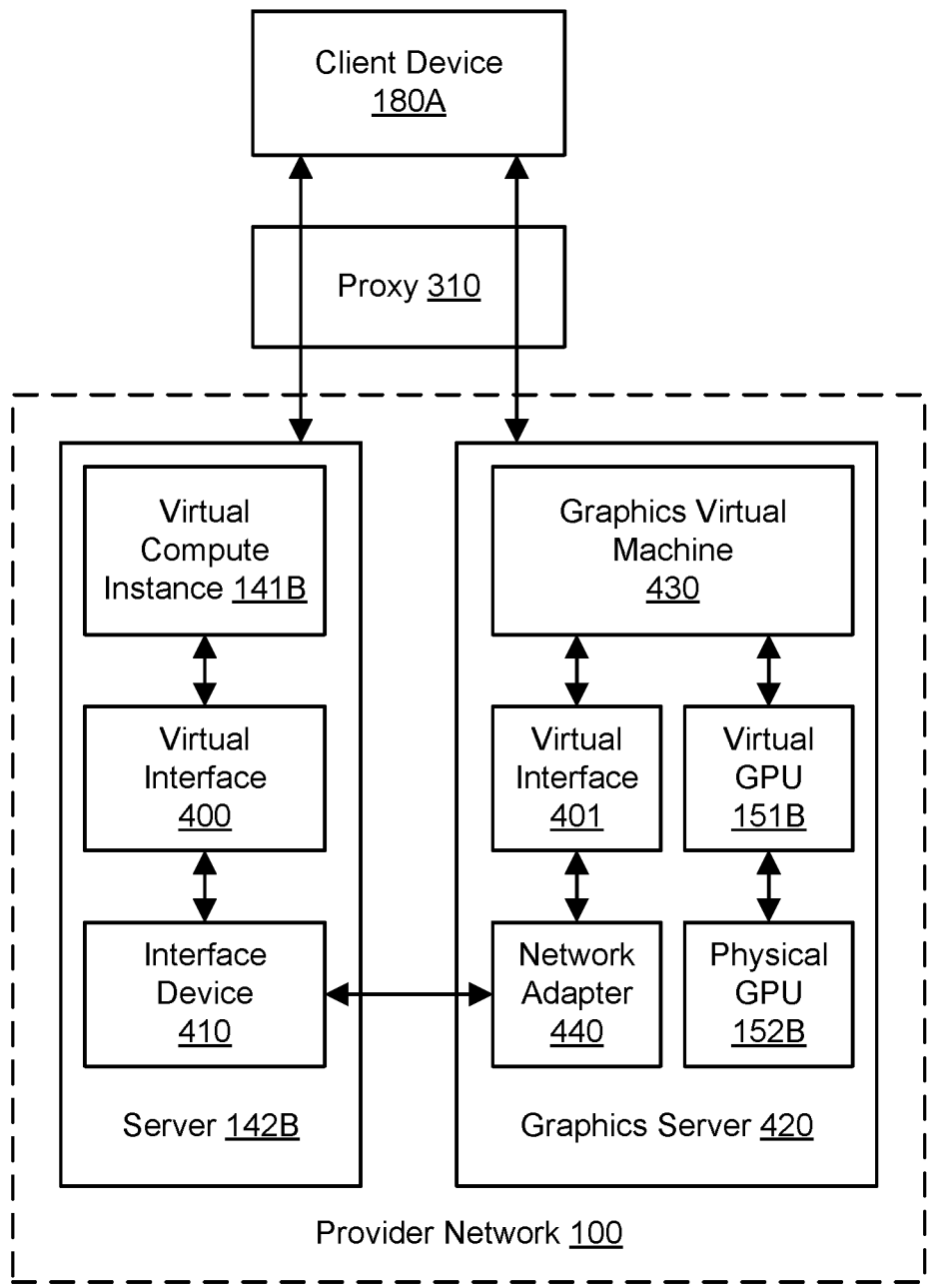
FIG. 4 illustrates an example hardware architecture for implementing virtualized graphics processing, according to one embodiment.

FIG. 4 illustrates an example hardware architecture for implementing virtualized graphics processing, according to one embodiment. In one embodiment, the virtual compute instance 141B may be implemented using a server 142B, and the virtual GPU 151B attached to that instance 141B may be implemented using a separate and distinct computing device termed a graphics server 420. The virtual compute instance 141B may use a virtual interface 400 to interact with an interface device 410. The virtual interface 400 may enable the virtual compute instance 141B to send and receive network data. The interface device 410 may include a network interface and a custom hardware interface. Via the custom hardware interface, the interface device 410 may run program code to emulate a GPU interface and appear to the virtual compute instance 141B to implement or include the virtual GPU 151B. In one embodiment, the interface device 410 may present a graphics API to the virtual compute instance 141B and receive API calls for graphics processing (e.g., accelerated 3D graphics processing). Via the network interface, the interface device 410 may communicate with the graphics server 420 (and thus with the physical GPU 152B) over a network. The interface device 410 may be implemented in any suitable manner, e.g., as an expansion card (such as a PCI Express card) or attached peripheral device for the server 142B. The interface device 410 may use single root I/O virtualization to expose hardware virtual functions to the virtual compute instance 141B. In one embodiment, the server 142B may implement a plurality of virtual compute instances, each with its own virtual interface, and the virtual compute instances may use the interface device 410 to interact with the corresponding virtual GPUs on one or more graphics servers. The server 142B may communicate with the proxy 310 using a suitable remoting protocol, e.g., to send data to and receive data from the client device 180A.

Graphics offload performed by the interface device 410 (e.g., by executing custom program code on the interface device) may translate graphics API commands into network traffic (encapsulating the graphics API commands) that is transmitted to the graphics server 420, and the graphics server 420 may execute the commands on behalf of the interface device. The graphics server 420 may include a network adapter 440 that communicates with the interface device 410 (e.g., with the network interface of the interface device) over a network. In one embodiment, the interface device 410 may receive calls to a graphics API (using the custom hardware interface) and generate graphics offload traffic to be sent to the network adapter 440 (using the network interface). The graphics server 410 may implement a graphics virtual machine 430. Any suitable technologies for virtualization may be used to implement the graphics virtual machine 430. In one embodiment, the graphics virtual machine 430 may represent a generic virtual machine that is GPU-capable and is dedicated to providing accelerated graphics processing using one or more virtual GPUs. The graphics virtual machine 430 may be coupled to the network adapter 440 using a virtual interface 401. The virtual interface 401 may enable the graphics virtual machine 430 to send and receive network data. The graphics virtual machine 430 may implement the virtual GPU 151B using the graphics processing capabilities of the physical GPU 152B. In one embodiment, the physical GPU 152B can be accessed directly by the graphics virtual machine 430, and the physical GPU 152B can use direct memory access to write to and read from memory managed by the graphics virtual machine. In one embodiment, the graphics server 420 may implement a plurality of virtual GPUs (such as virtual GPU 151B) using one or more physical GPUs (such as physical GPU 152B), and the virtual GPUs may interact with the corresponding virtual compute instances on one or more servers over a network. The graphics server 420 may communicate with the proxy 310 using a suitable remoting protocol, e.g., to send data to and receive data from the client device 180A. For example, the graphics server 420 may generate virtual GPU output based on the commands sent from the interface device 410. The virtual GPU output may be provided to the client device 180A through the proxy 310, e.g., from the server 142B or graphics server 420.

Figure 5:
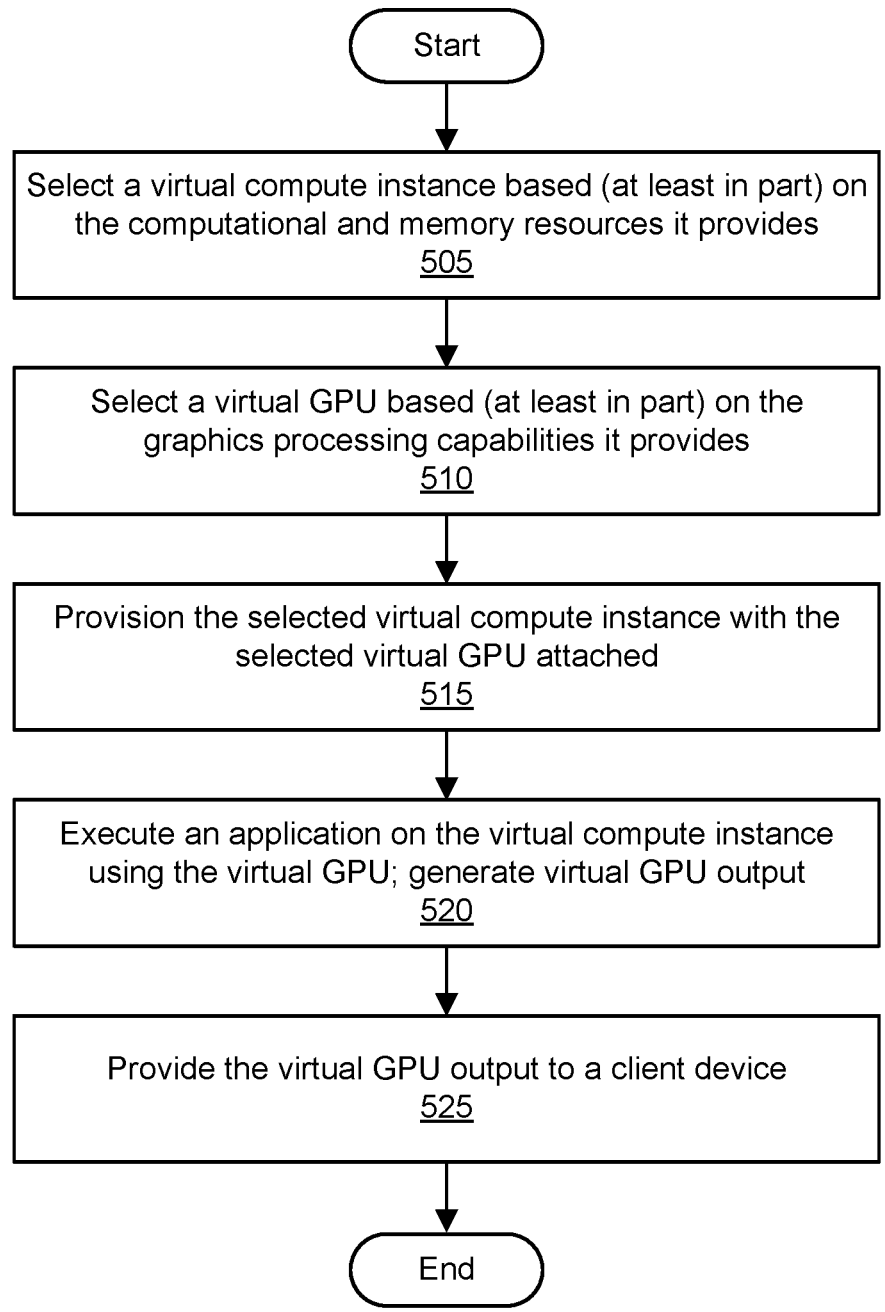
FIG. 5 is a flowchart illustrating a method for virtualizing graphics processing in a provider network, according to one embodiment.

FIG. 5 is a flowchart illustrating a method for virtualizing graphics processing in a provider network, according to one embodiment. As shown in 505, a virtual compute instance may be selected. The virtual compute instance may be selected based (at least in part) on computational and memory resources provided by the virtual compute instance. For example, the virtual compute instance may be selected based (at least in part) on a selection of an instance type by a user. As shown in 510, a virtual GPU may be selected. The virtual GPU may be selected based (at least in part) on graphics processing capabilities provided by the virtual GPU. For example, the virtual GPU may be selected based (at least in part) on a selection of a virtual GPU class by a user. The virtual compute instance and virtual GPU may also be selected based (at least in part) on availability of resources in a resource pool of a provider network that manages such resources. In one embodiment, an elastic graphics service may receive the specifications for and/or selections of the virtual compute instance and virtual GPU.

As shown in 515, the selected virtual compute instance may be provisioned with the selected virtual GPU attached. In one embodiment, the elastic graphics service may interact with one or more other services or functionalities of a provider network, such as a compute virtualization functionality and/or GPU virtualization functionality, to provision the instance with the virtual GPU. The virtual compute instance may be implemented using central processing unit (CPU) resources and memory resources of a server. The virtual GPU may be implemented using a physical GPU. The physical GPU may be attached to a different computing device than the computing device that provides the CPU resources for the virtual compute instance. The physical GPU may be accessible to the server over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network.

As shown in 520, an application may be executed on the virtual compute instance using the virtual GPU. Execution of the application may include execution of instructions on the virtual compute instance (e.g., on the underlying server) and/or virtual GPU (e.g., on the underlying physical GPU). Execution of the application using the virtual GPU may generate virtual GPU output, e.g., output produced by executing instructions or otherwise performing tasks on the virtual GPU. As shown in 525, the virtual GPU output may be provided to a client device. The virtual GPU output may be provided to the client device from the virtual compute instance or virtual GPU. In one embodiment, the virtual GPU output may be displayed on a display device associated with the client device. The virtual GPU output may include pixel information or other graphical data that is displayed on the display device. Execution of the application using the virtual GPU may include graphics processing (e.g., acceleration of three-dimensional graphics processing) for the application using a graphics API.

In some embodiments, scaling techniques may be used with the techniques for virtualized graphics processing described herein. A virtual compute instance may be provisioned, and a first set of one or more GPU(s) may be attached to the instance to provide graphics processing. The first set of one or more virtual GPUs may provide a particular level of graphics processing. After a change in GPU requirements for the instance is determined, the second set of one or more virtual GPU(s) may be selected and attached to the virtual compute instance to replace the graphics processing of the first virtual GPU(s) with a different level of graphics processing. The second virtual GPU(s) may be selected based on the change in GPU requirements. Depending upon the change in GPU requirements, such a scaling operation may migrate graphics processing for a virtual compute instance from a less capable or smaller virtual GPU class to a more capable or larger virtual GPU class or from a more capable or larger virtual GPU class to a less capable or smaller virtual GPU class. In one embodiment, the migration of graphics processing may be performed based (at least in part) on user input representing a change in GPU requirements. In one embodiment, the migration of graphics processing may be performed based (at least in part) on detection of an increase in graphics workload. Live migration may be performed while applications are being executed using the first virtual GPU(s) in a manner that does not require changing or relaunching the applications. Migration of the virtual compute instance to a different server may also be performed, e.g., to reduce network latency associated with virtualized graphics processing.

In some embodiments, placement optimization techniques may be used with the techniques for virtualized graphics processing described herein. Optimization of resource placement may improve one or more metrics (e.g., related to resource usage or cost) for GPU virtualization. Server(s) may be used to implement virtual compute instance(s), and physical GPU(s) may be used to implement virtual GPU(s) attached to the virtual compute instance(s). Using techniques for placement optimization, locations of the virtual compute instance(s) and/or virtual GPU(s) may be selected in the provider network (from among a set of available server(s) and/or physical GPU(s)) based on any suitable placement criteria. The one or more placement criteria may be based (at least in part) on metrics associated with maximizing performance, minimizing cost, minimizing energy usage, and/or any other suitable metrics. The placement criteria may also be associated with network locality. For example, to minimize network latency and/or network usage, a virtual compute instance and attached virtual GPU may be placed in the same rack in the same data center such that network communication between the underlying server and physical GPU may not extend beyond a top-of-rack switch or other networking component in the rack. If locations within the same rack are not available, then nearby locations within the same data center may be selected for a virtual compute instance and attached virtual GPU. Placement may be optimized in this manner not only for newly provisioned resources but also for migration of a virtual compute instance and/or attached virtual GPU after their use has begun. When scaling is performed for GPU virtualization as discussed above, the locations of any virtual GPUs may be selected based on placement criteria, and/or the location of the virtual compute instance may be moved based on placement criteria.

In some embodiments, local-to-remote migration techniques may be used with the techniques for virtualized graphics processing described herein. A virtual compute instance may be provisioned with a local graphics processing unit (GPU) to provide graphics processing. The local GPU may be implemented using attached hardware or using emulation. Because the local GPU may provide only a low level of graphics processing capability, a virtual GPU may be attached to the virtual compute instance to provide improved graphics processing relative to the local GPU. The virtual GPU may be selected from a set of virtual GPUs (e.g., belonging to virtual GPU classes) having different capabilities for graphics processing. The virtual GPU may be implemented using a physical GPU that is connected to the virtual compute instance over a network. Graphics processing for the virtual compute instance may be migrated from the local GPU to the virtual GPU. In one embodiment, graphics processing for a particular application on the virtual compute instance may be migrated from the local GPU to the virtual GPU during execution of the application. In one embodiment, the migration of graphics processing may be performed based (at least in part) on detection of an increase in graphics workload.

In some embodiments, graphics overlays may be implemented with the techniques for virtualized graphics processing described herein. A virtual compute instance may be provisioned with an attached virtual GPU. In executing a particular application, the virtual compute instance may send graphics instructions to the graphics server for generating graphical output associated with the application. The graphical output may include graphical elements, including objects, pixels, and so on, as determined by execution of the graphics instructions sent from the virtual compute instance. A graphics overlay may be added to the graphical output after the graphics instructions from the virtual compute instance are received by the graphics server. The graphics overlay may include one or more additional graphical elements, and the additional graphical elements may be placed on top of (and may therefore obscure, at least partially) any of the graphical elements generated by execution of the "original" graphics instructions sent from the virtual compute instance. For example, the graphics overlay may include a display of metadata such as a current frame rate, an in-application chat window, and so on. Instead of using code injection in an application to modify or append graphics instructions to generate an overlay, the graphics overlay may be generated at the graphics server using additional graphics instructions determined at that server, at a dedicated graphics overlay server using graphical output received from the graphics server, or at the server using graphical output received from the graphics server. Using these techniques, graphical output of a virtual GPU may be modified with overlays in a trustworthy manner, e.g., without necessarily modifying an application on whose behalf the graphical output is generated.

Interaction Monitoring for Virtualized Graphics Processing

Figure 6:
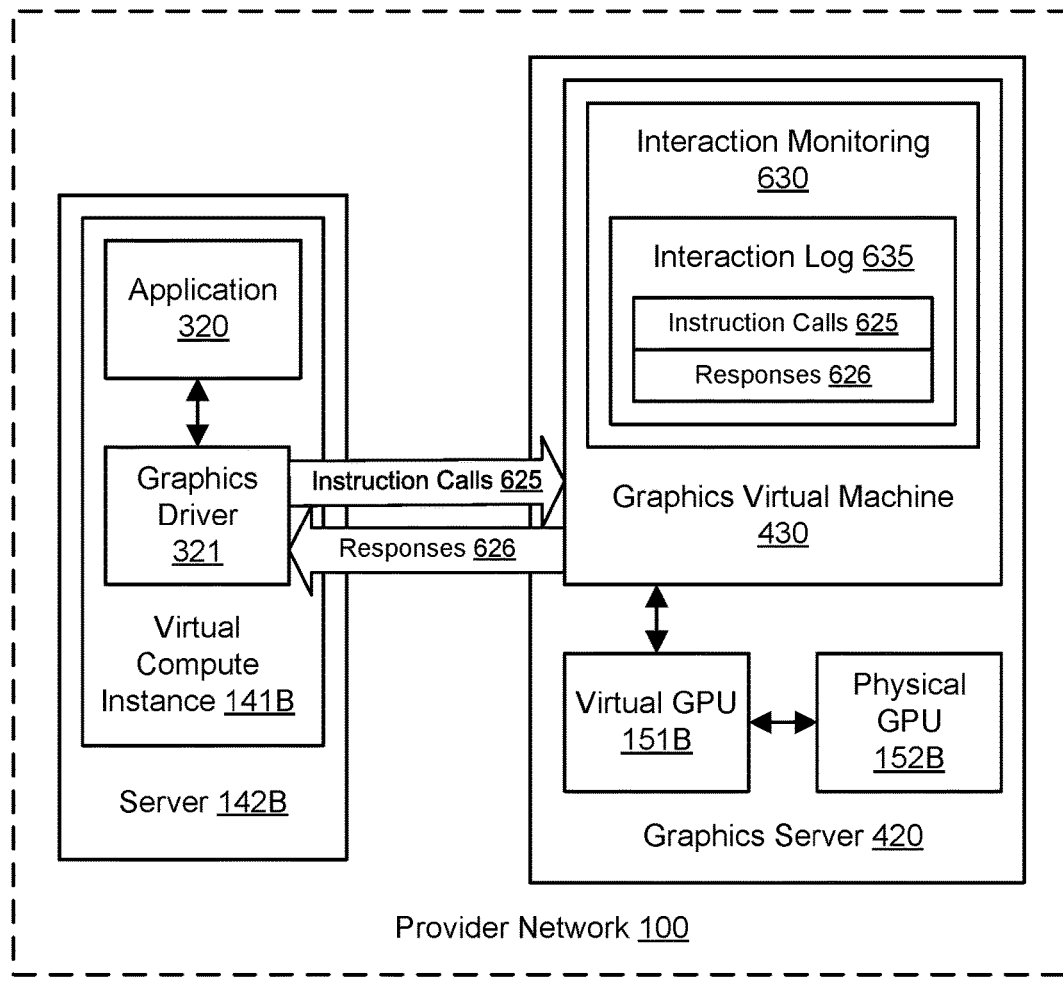
FIG. 6 illustrates an example system environment for interaction monitoring for virtualized graphics processing, according to one embodiment.

FIG. 6 illustrates an example system environment for interaction monitoring for virtualized graphics processing, according to one embodiment. As discussed above with respect to FIG. 1 through FIG. 5, a virtual compute instance 141B may be provisioned with an attached virtual GPU 151B. The virtual compute instance 141B may be implemented using an underlying server 142B, and the virtual GPU 151B may be implemented using an underlying physical GPU 152B resident in a graphics server 420 that is accessible to the server through a network. After the virtual compute instance 141B is provisioned with the attached virtual GPU 151B, a client may use the provisioned virtual compute instance and virtual GPU to perform any suitable tasks, e.g., based on input from the client. The virtual compute instance 141B may execute a particular application 320. The application 320 may be selected or provided by the client. The virtual compute instance 141B may also be configured with a particular operating system (such as operating system 322) that provides support for the application 320. As will be described in greater detail below, interactions between the application 320 and the virtual GPU 151B may be monitored, logged, and potentially analyzed, e.g., to recommend performance optimizations of the application.

In various embodiments, the virtual compute instance 141B may have any suitable number and configuration of applications. As used herein, the term "application" generally includes a set of program instructions, a software package, or a set of interconnected software resources designed to perform a set of coordinated functions when executed on a compute instance, often on top of an operating system resident on the compute instance. In some embodiments, the interaction monitoring techniques described herein may be used with types of software other than applications, potentially including software associated with an operating system. The client (using a client device such as device 180A) may provide application input to the application 320 running on the virtual compute instance 141B, potentially through a proxy. For example, the application input may include data to be operated upon by the application 320 and/or instructions to control the execution of the application.

Additionally, the virtual compute instance 141B may be configured with one or more graphics drivers such as graphics driver 321. The graphics driver 321 may interact with the virtual GPU 151B to provide graphics processing or compute processing for the application 320, potentially including accelerated two-dimensional graphics processing and/or accelerated three-dimensional graphics processing or parallel processing of compute tasks. The graphics driver 321 may implement a graphics application programming interface (API) such as Direct3D or OpenGL or a general-purpose GPU computing (GPGPU) API such as OpenCL. The graphics driver 321 may represent components running in user mode and/or kernel mode. Additional components (not shown), such as a graphics runtime, may also be used to provide accelerated GPU processing for the virtual compute instance 141B.

To utilize the attached virtual GPU 151B, the application 320 may invoke functionality associated with the graphics driver 321, e.g., by making API calls to the graphics driver for implementation using a GPU. As discussed above with respect to FIG. 1 through FIG. 5, the graphics driver 321 may intercept these calls and send them to the graphics server 420 over a network rather than to a locally attached GPU. As shown in the example of FIG. 6, the graphics driver 321 (potentially with intermediate components in software and hardware) may send instruction calls 625 to a component of the graphics server 420, such as the graphics virtual machine 430. In various embodiments, the instruction calls 625 may represent API calls associated with a graphics API such as Direct3D or OpenGL and/or API calls associated with a GPGPU API such as OpenCL. The instruction calls 625 may include invocations of functions as well as parameters and data associated with particular invocations of functions. The instruction calls 625 may also be referred to as instructions, requested operations, or task requests. Upon receipt by the graphics virtual machine 430, the calls 625 may be executed or otherwise implemented using the virtual GPU 151B. A component of the graphics server 420 (such as the graphics virtual machine 430) may also produce responses 626 to at least some (but not necessarily all) of the instruction calls 625. For example, the responses 626 may include status updates in response to status inquiries, acknowledgements of receipt of instructions and/or data, errors generated in attempts to process or implement the calls 625, and so on. The responses 626 may be sent to an appropriate target, such as the graphics driver 321 and potentially on to the application 320 itself.

In one embodiment, an interaction monitoring component 630 may intercept and log interactions between the application 320 on the virtual compute instance and the virtual GPU 151B on the graphics server. In various embodiments, the functionality of the interaction monitoring component 630 may be implemented in the graphics server 420, in the virtual compute instance 141B, or in a combination of the two. In one embodiment, the interactions that are intercepted and logged are typically routed between the graphics driver 321 that takes calls from the application 320 and the graphics virtual machine 430 that mediates access to the virtual GPU 151B. The interaction monitoring 630 may generate an interaction log 635 that represents a persistent data structure storing the interactions between the application 320 and the virtual GPU 151B. In one embodiment, the interaction log 635 may include one or more of the instruction calls 625. In one embodiment, the interaction log 635 may include one or more of the responses 626 to the instruction calls 625. In one embodiment, the log may list the interactions in the order in which they occurred, e.g., based on the chronological order of receipt of the instruction calls 625 and the generation or sending of any responses 626. The interactions in the log 635 may be associated with timestamps, e.g., representing times according to a clock on the graphics virtual machine 430 or graphics server 420. In one embodiment, the interaction log 635 may represent all or nearly all of the instruction calls 625 received during a particular period of time. In one embodiment, the interaction log 635 may represent a subset of the instruction calls 625 received during a particular period of time, e.g., by sampling a percentage of the calls and/or by filtering for relevant types of calls. The log 635 may also be referred to as a trace. In some embodiments, the interaction monitoring 630 may be performed automatically (e.g., without being directly prompted by user input or without necessarily requiring user input beyond an initial configuration stage) and/or programmatically (e.g., by execution of program instructions).

The log 635 may be associated with a combination of the particular application 320 and the particular virtual GPU 151B. The log 635 may be associated with a particular session for the particular application 320 and the particular virtual GPU 151B. The session may start and stop at any suitable points in time, and the log 635 may include interactions occurring within those points in time. For example, the interaction monitoring 630 for a particular session may be started on or after the launching of the application 320 and may be stopped on or before termination of the application. In some embodiments, the interaction monitoring 630 may be performed only with express permission by one or more other entities, such as a vendor of the application 320 and/or a user of the application. For example, the vendor may register the application 320 for interaction monitoring with a suitable component of the provider network 100, such as a centralized application profiling service that will be discussed below. As another example, the interaction monitoring may be enabled or disabled by the particular instance of the application 320 on the virtual compute instance 141B, e.g., based on suitable elements in the program code or associated program data of the application. As yet another example, the interaction monitoring may be enabled or disabled by a user of the particular instance of the application 320 on the virtual compute instance 141B, e.g., by checking or unchecking a box or otherwise using an element of a user interface associated with the application. In various embodiments, a vendor of the application may represent an author, distributor, and/or publisher.

Execution of the instruction calls 625 using the virtual GPU 151B may produce virtual GPU output. The virtual GPU output may be provided to the client device (such as device 180A), e.g., directly from the virtual GPU 151B or routed through virtual compute instance 141B. In one embodiment, the virtual GPU output may be sent from the virtual GPU 151B (e.g., from a computing device that includes the virtual GPU) to the client device while bypassing the rest of the virtual compute instance 141B (e.g., the underlying server 142B). In one embodiment, the virtual GPU output may be sent to the client device 180A through a proxy. In one embodiment, the virtual GPU output may be returned to the virtual compute instance 141B, and the virtual compute instance may send the virtual GPU output to the client device. In one embodiment, the client device may forward the virtual GPU output to another component. In one embodiment, a portion of the virtual GPU output may be stored in the log 635. For example, particular frames in the output may be captured using sampling techniques and stored for quality assurance purposes.

In one embodiment, a display device associated with the client device may present a display of the virtual GPU output. In one embodiment, the virtual GPU output may include pixel data, image data, video data, or other graphical data. In one embodiment, the virtual GPU output may drive a full-screen display on the display device. Portions of the virtual GPU output may be streamed to the client device over time. In one embodiment, the virtual GPU output may be composited with one or more other sources of graphical data to produce the display. In one embodiment, the virtual GPU 151B may be used for general-purpose computing (e.g., GPGPU computing), and the virtual GPU output may not include pixel data or other graphical data. In various embodiments, the client device may process or transform all or part of the virtual GPU output before displaying the output. For example, a CPU, GPU, or co-processor on the client device may transform portions of the virtual GPU output and display the results on the display device.

Figure 7:
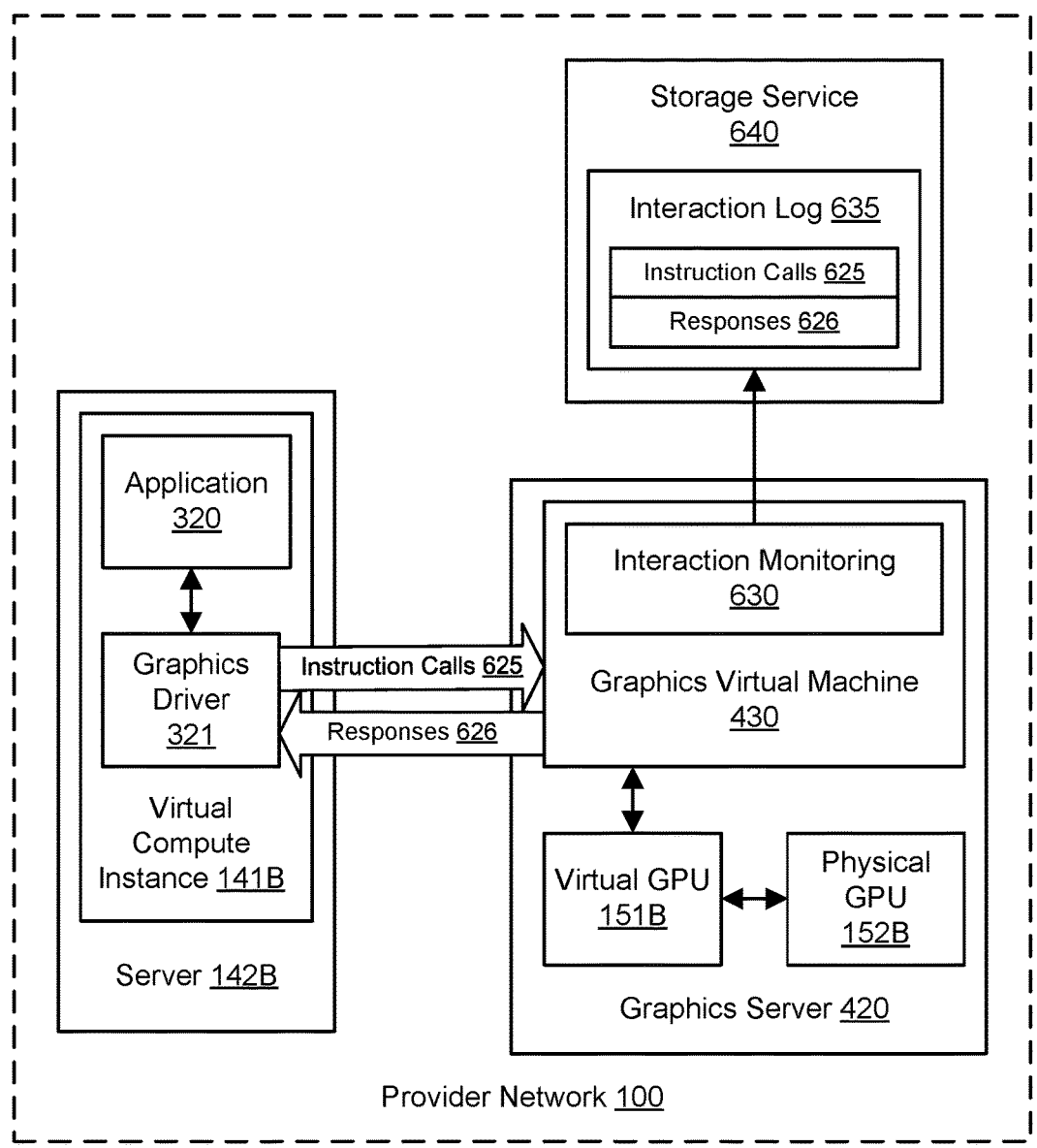
FIG. 7 illustrates further aspects of the example system environment for interaction monitoring for virtualized graphics processing, including storage of an interaction log using a storage service, according to one embodiment.

FIG. 7 illustrates further aspects of the example system environment for interaction monitoring for virtualized graphics processing, including storage of an interaction log using a storage service, according to one embodiment. In one embodiment, one or more elements of the log 635 may initially be stored in memory or persistent storage associated with the graphics server 420, e.g., while the log is being generated during a session. In one embodiment, at some point, one or more elements of the log 635 may be transferred to persistent storage external to the graphics server 420. As shown in the example of FIG. 7, the log 635 may be stored using an external storage service 640. The storage service 640 may be a "cloud" storage service that is provided within the same provider network 100 or in a different provider network or environment. In one embodiment, the storage service 640 may represent Amazon Simple Storage Service (S3). In one embodiment, older elements of the log 635 may be moved to the storage service 640 during a session of interaction monitoring. In one embodiment, the entire log 635 (or the remainder still on the graphics server 420) may be relocated to the storage service 640 upon termination of the session. The log 635 may be moved to the storage service 640 in one batch (e.g., after the session is over) or in several batches (e.g., during the session). Elements of the log 635 that are transferred from the graphics server 420 to the storage service 640 may not be retained on the graphics server, e.g., by deleting the elements or marking them for deletion upon transfer to the storage service. For security purposes, the elements of the log 635 may be completely eliminated from the graphics server 420 before the graphics server is provided to another client in the multi-tenant provider network 100.

In some embodiments, the transfer of the log 635 to the storage service 640 may be performed only with express permission by one or more other entities, such as a vendor of the application 320 and/or a user of the application. For example, the vendor may register the application 320 for interaction logging with a suitable component of the provider network 100, such as a centralized application profiling service that will be discussed below. As another example, the interaction logging may be enabled or disabled by the particular instance of the application 320 on the virtual compute instance 141B, e.g., based on suitable elements in the program code or associated program data of the application. As yet another example, the interaction logging may be enabled or disabled by a user of the particular instance of the application 320 on the virtual compute instance 141B, e.g., by checking or unchecking a box or otherwise using an element of a user interface associated with the application. In one embodiment, the log 635 may be stored in one or more storage locations of the storage service 640 that are owned by or otherwise accessible to a vendor of the application. For example, the vendor may have an account with a cloud storage service such as Amazon S3, and the log 635 for a session may be stored in one or more "buckets" or other storage locations associated with that account. The vendor may supply appropriate access credentials to permit the interaction monitoring component 630 to write to the vendor-owner storage. In one embodiment, the storage service 649 may store multiple logs representing multiple sessions. The interaction monitoring functionality 630 may be offered to many application vendors, and so multiple logs in the storage service 640 may be associated with one or more applications and one or more application vendors. As virtual compute instances and virtual GPUs are provisioned and deprovisioned in the provider network 100 over time, the logs for various sessions are typically associated with a variety of different virtual compute instances and virtual GPUs.

Figure 8:
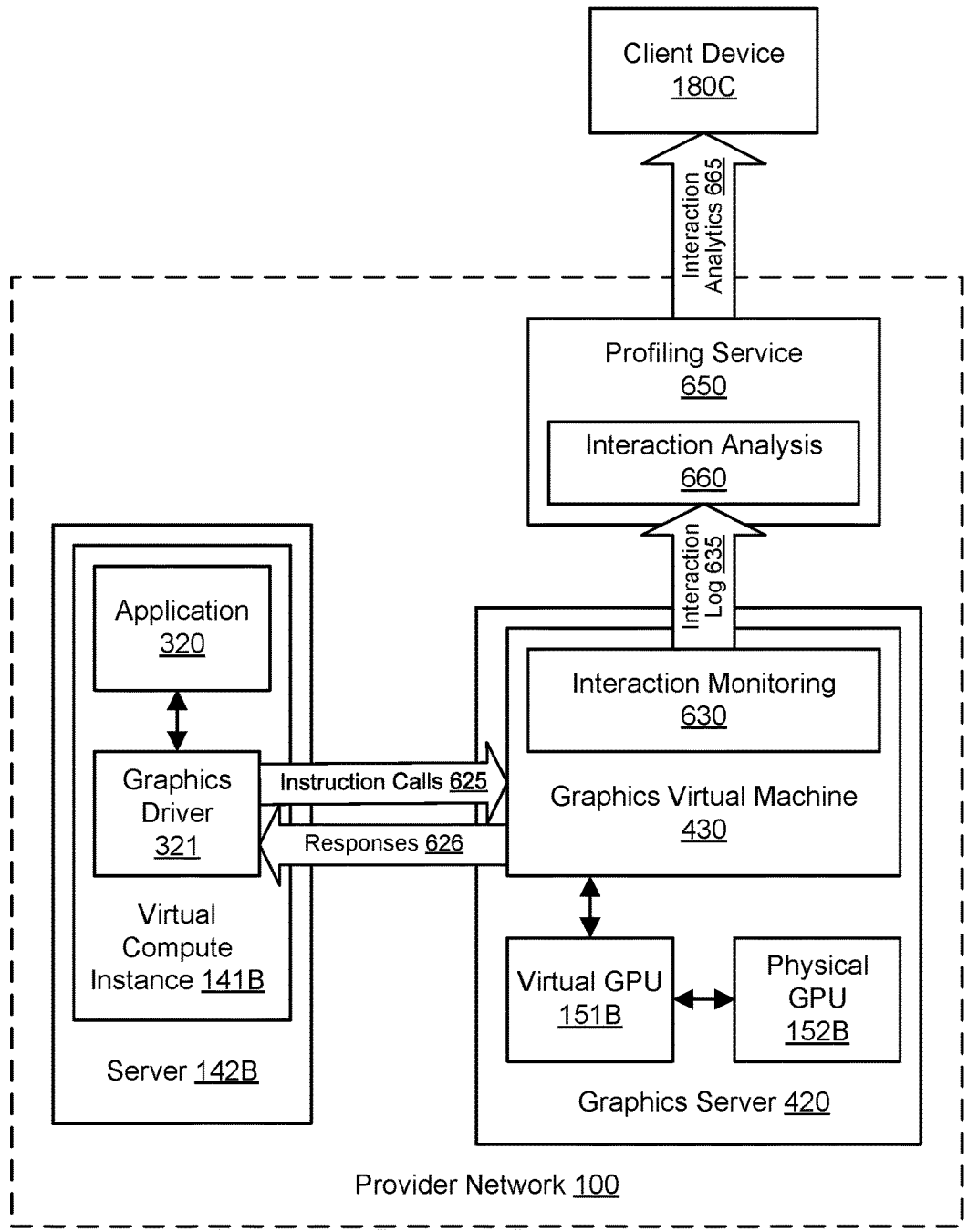
FIG. 8 illustrates further aspects of the example system environment for interaction monitoring for virtualized graphics processing, including a profiling service that performs interaction analysis to generate analytics for a client, according to one embodiment.

FIG. 8 illustrates further aspects of the example system environment for interaction monitoring for virtualized graphics processing, including a profiling service that performs interaction analysis to generate analytics for a client, according to one embodiment. A profiling service 650, also referred to as an application profiling service or application-GPU interaction profiling service, may perform interaction analysis 660 of the monitored interactions for one or more sessions. In one embodiment, the interaction log 635 for a particular session may be provided to the profiling service 650 from the corresponding graphics server 420. In one embodiment, the interaction log 635 for a particular session may be provided to the profiling service 650 through an external storage service 640, e.g., by an appropriate entity granting the profiling service read access to storage locations owned by or associated with a vendor of the application. The profiling service 650 may be offered to many application vendors. In one embodiment, vendors may register their applications with the profiling service 650, and the registration of an application may include approval by the vendor for interaction monitoring and persistent storage of interaction logs associated with the application. The vendor may supply appropriate access credentials to permit the profiling service 650 to read from the vendor-owner storage. In some embodiments, the interaction analysis 660 may be performed automatically (e.g., without being directly prompted by user input or without necessarily requiring user input beyond an initial configuration stage) and/or programmatically (e.g., by execution of program instructions). The profiling service 650 may be implemented using one or more computing devices, any of which may be implemented by the example computing device 3000 illustrated in FIG. 12.

In one embodiment, the interaction analysis 660 may generate interaction analytics 665 based (at least in part) on the interaction log 635. In one embodiment, the interaction analytics 665 may relate to one session associated with a particular application (such as application 321) and a particular virtual GPU (such as virtual GPU 151B). In one embodiment, the interaction analytics 665 may relate to many sessions associated with a particular application and one or more virtual GPUs. The interaction analytics 665 may also be referred to as a profile. The interaction analytics 665 may include any suitable metrics, analysis, or other data relevant to use of one or more virtual GPUs by an application. For example, the interaction analytics 665 may include latency metrics related to one or more types of operations requested by the application 320 of the virtual GPU 151B over the network. As another example, the interaction analytics 665 may indicate a distribution of different types of operations requested by the application 320 of the virtual GPU 151B, potentially using any suitable charts or other visualizations. As another example, the interaction analytics 665 may indicate one or more ratios of different types of operations requested by the application 320 of the virtual GPU 151B. In one embodiment, the interaction analytics 665 may include one or more conclusions reached by the profiling service 650 regarding the use of one or more virtual GPUs by an application. For example, the interaction analytics 665 may indicate the latency or number of round-trips for particular types of operations and whether the latency meets any appropriate service-level agreements (SLAs). As yet another example, the interaction analytics 665 may indicate the operations with the longest latency and/or operations with an excessive degree of forced flushing of buffers across the network. In some embodiments, the interaction analytics 665 may generally indicate unnecessary input/output or network usage among particular types of operations.

The interaction analytics 665 for a particular application may be provided or otherwise made accessible to an appropriate client of the profiling service 650. As shown in the example of FIG. 8, the interaction analytics 665 for a particular application may be provided or otherwise made accessible to a client device 180C associated with a vendor of the application. The client device 180C may be implemented using one or more computing devices, any of which may be implemented by the example computing device 3000 illustrated in FIG. 12. The client device 180C may include a user interface that permits a user to view and explore the interaction analytics 665, e.g., by drilling down to a particular session from a summary of multiple sessions, by drilling down into more detailed metrics data from a summary of a metric, and so on. In one embodiment, the interaction analytics 665 may be sent by the profiling service 650 to the client device 180C over a network. In one embodiment, the interaction analytics 665 may be stored in an external storage service such as service 640, potentially in the same or adjacent storage locations as the underlying log 635, and the client device 180C may obtain the interaction analytics by accessing the appropriate storage locations.

In some embodiments, the interaction monitoring and log analysis (referred to collectively as profiling) may be configurable by the application vendor. For example, the vendor may request one-time profiling or profiling at a particular interval. As another example, the vendor may request a sampling frequency or sampling period such that only a subset of interactions are logged. As discussed previously, the profiling may also be enabled or disabled by request of the vendor of the application. In one embodiment, the interaction analytics 665 may be provided to the client 180C based (at least in part) on a request from the client. In one embodiment, the interaction analytics 665 may be pushed to the client 180C without the client necessarily requesting the specific analytics. For example, using a recommendation service such as Amazon Trusted Advisor, interaction analytics 665 may be generated that recommend particular GPU classes or characteristics for use with the application 320. In one embodiment, a vendor of the application 320 may be provided with interaction analytics 665 based on aggregated and anonymized logs of interactions with different users.

In one embodiment, the graphics server 420 may offer virtualized graphics processing (or virtualized GPGPU compute processing) to a plurality of different clients at a given time. The different clients may execute different applications that take advantage of the same virtual GPU in the multi-tenant graphics server, e.g., using multiple application contexts in the graphics server. In such a scenario, the interaction analytics 665 may relate to more than one application executed by more than one user. The interaction analytics 665 may include analytics related to context switching and/or may be used to optimize context switching in multi-tenant graphics servers.

Figure 9:
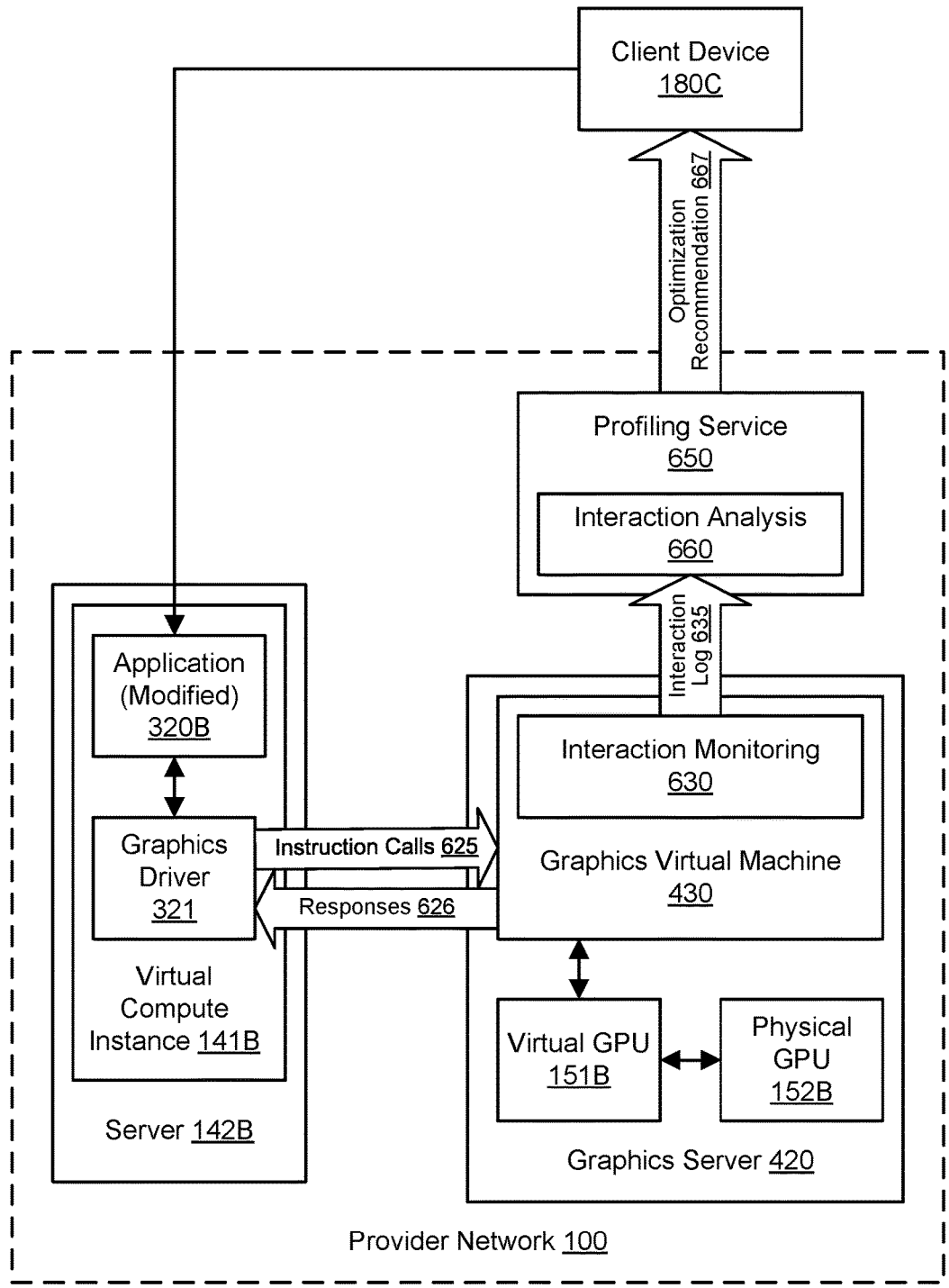
FIG. 9 illustrates further aspects of the example system environment for interaction monitoring for virtualized graphics processing, including a profiling service that performs interaction analysis to generate an optimization recommendation for a client, according to one embodiment.

FIG. 9 illustrates further aspects of the example system environment for interaction monitoring for virtualized graphics processing, including a profiling service that performs interaction analysis to generate an optimization recommendation for a client, according to one embodiment. In one embodiment, the interaction analysis 660 may generate an optimization recommendation 667 based (at least in part) on the interaction log 635. In one embodiment, the optimization recommendation 667 may relate to one session associated with a particular application (such as application 321) and a particular virtual GPU (such as virtual GPU 151B). In one embodiment, the optimization recommendation 667 may relate to many sessions associated with a particular application and one or more virtual GPUs. As used herein, the term "optimization" generally relates to improvement in one or more respects and not necessarily to reaching an ideal state. The optimization recommendation 667 may represent one or more suggested modifications to an application. In one embodiment, the optimization recommendation 667 may recommend that an application invoke particular operations less frequently, more frequently, and/or in a different order. For example, the optimization recommendation 667 may recommend that the application make status requests less frequently. In one embodiment, the optimization recommendation 667 may recommend that an application invoke different operations or differently configured operations than those presently used in the application. For example, the optimization recommendation 667 may recommend that data associated with particular GPU operations be buffered in a smaller quantity or in a larger quantity before being sent over the network from the server 142B to the graphics server 420, e.g., in order to improve latency. The optimization recommendation 667 may also indicate reasons for suggested modifications, such as relevant ones of the analytics 665.

The optimization recommendation 667 for a particular application may be provided or otherwise made accessible to an appropriate client of the profiling service 650. As shown in the example of FIG. 9, the optimization recommendation 667 for a particular application may be provided or otherwise made accessible to a client device 180C associated with a vendor of the application. The client device 180C may include a user interface that permits a user to view and explore the optimization recommendation 667. In one embodiment, the optimization recommendation 667 may be sent by the profiling service 650 to the client device 180C over a network. In one embodiment, the optimization recommendation 667 may be stored in an external storage service such as service 640, potentially in the same or adjacent storage locations as the underlying log 635, and the client device 180C may obtain the optimization recommendation by accessing the appropriate storage locations.

The vendor associated with the client device 180C may produce a modified version 320B of the application 320 based (at least in part) on the optimization recommendation 667. In one embodiment, the application 320 may be modified in an attempt to improve one or more performance metrics, e.g., one or more network latency metrics, that are associated with use of a virtual GPU by the application. The modified application 320B may invoke particular operations less frequently, more frequently, and/or in a different order than in the original application 320. The modified application 320B may invoke different operations or differently configured operations than in the original application 320. The modified application 320B may be deployed to and executed on a virtual compute instance such as instance 141B, and the interactions between the modified application and a virtual GPU may again be monitored and analyzed, e.g., to determine any differences in performance. In one embodiment, any differences in performance between different versions of the application 320 may be reported to the vendor in the analytics 665. In one embodiment, the modified application 320B may have improved performance with a network-attached virtual GPU and also in a system with a locally attached GPU.

Figure 10:
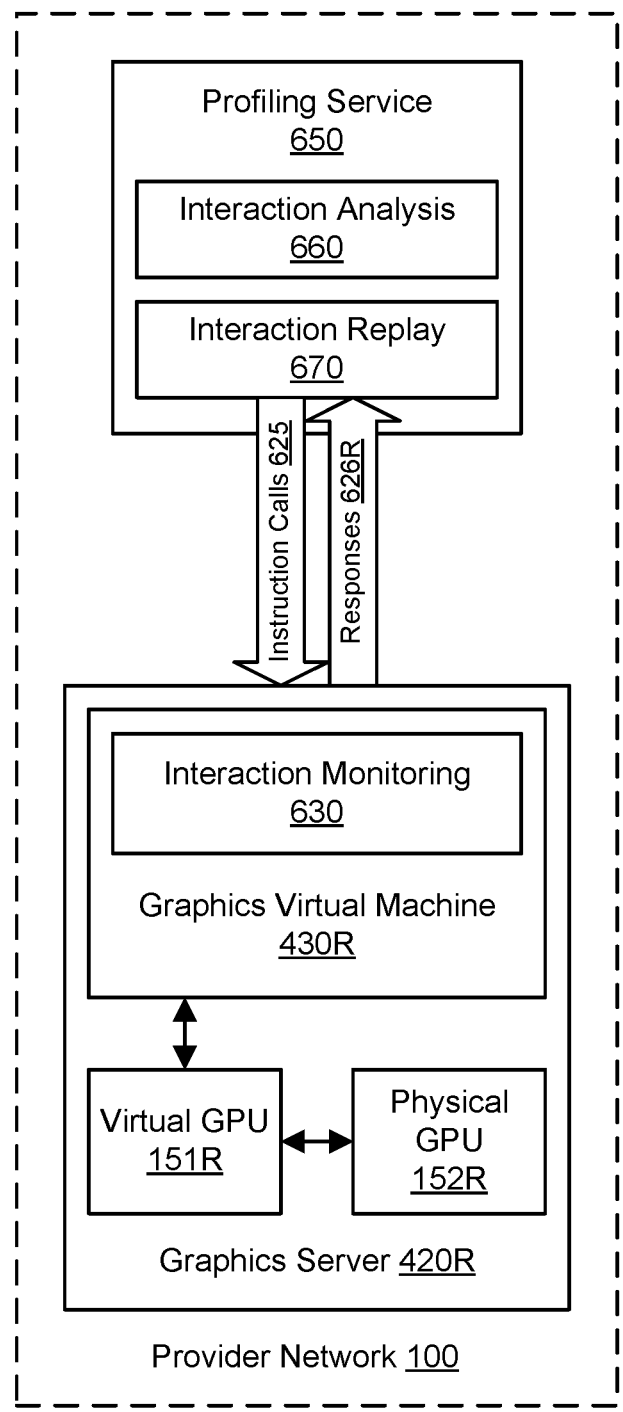
FIG. 10 illustrates further aspects of the example system environment for interaction monitoring for virtualized graphics processing, including a profiling service that initiates replay of logged interactions using another virtual GPU, according to one embodiment.

FIG. 10 illustrates further aspects of the example system environment for interaction monitoring for virtualized graphics processing, including a profiling service that initiates replay of logged interactions using another virtual GPU, according to one embodiment. In one embodiment, the profiling service 650 may include a component or functionality for interaction replay 670. Using the interaction replay component 670, one or more of the interactions in the log 635 may be replayed in another virtual GPU. For example, the instruction calls 625 associated with a particular session may be sent again to a replay graphics server 420R for execution using a virtual GPU 151R. The replay graphics server 420R may be implemented using a similar techniques as the original graphics server 420 and may represent a newly provisioned virtual resource with a newly attached virtual GPU 151R. In one embodiment, at least a portion of the interaction replay functionality 670 may be located in the graphics server 420R. A replay may be initiated by a client of the profiling service 650 (e.g., a vendor of the application) using any suitable user interface or programmatic interface. The client may provide the log 635 to be replayed as well as any constraints or configuration parameters associated with the replay, such as an indication of GPU characteristics for the virtual GPU 151R and/or physical GPU 152R.

In one embodiment, a different class of virtual GPU 151R may be used for the replay. The replay server 420R may include a different physical GPU 152R than the original physical GPU 152B, and the replay server may also include a graphics virtual machine 430R that mediates access to the virtual GPU 151R. In some embodiments, the replay virtual GPU 151R may have one or more different characteristics than the original virtual GPU 151B, and/or the replay physical GPU 152R may have one or more different characteristics than the original physical GPU 152B. For example, the physical GPUs 152B and 152R may have different hardware features or different amounts of memory or may be from different vendors. Using the interaction monitoring component 630, a log of the replay may also be generated. The replay log may potentially include a different set of responses 626R to the instruction calls 625. The replay log may be analyzed by the profiling service 650. In one embodiment, any differences between the original performance of the application and the performance in the replay may be reported to the vendor in the analytics 665. In one embodiment, the profiling service 650 may initiate a replay of the interaction log 635 (e.g., of the instruction calls 625) in more than one graphics server, e.g., to determine differences in performance between graphics servers or virtual GPUs or physical GPUs having different features or configurations.

Figure 11:
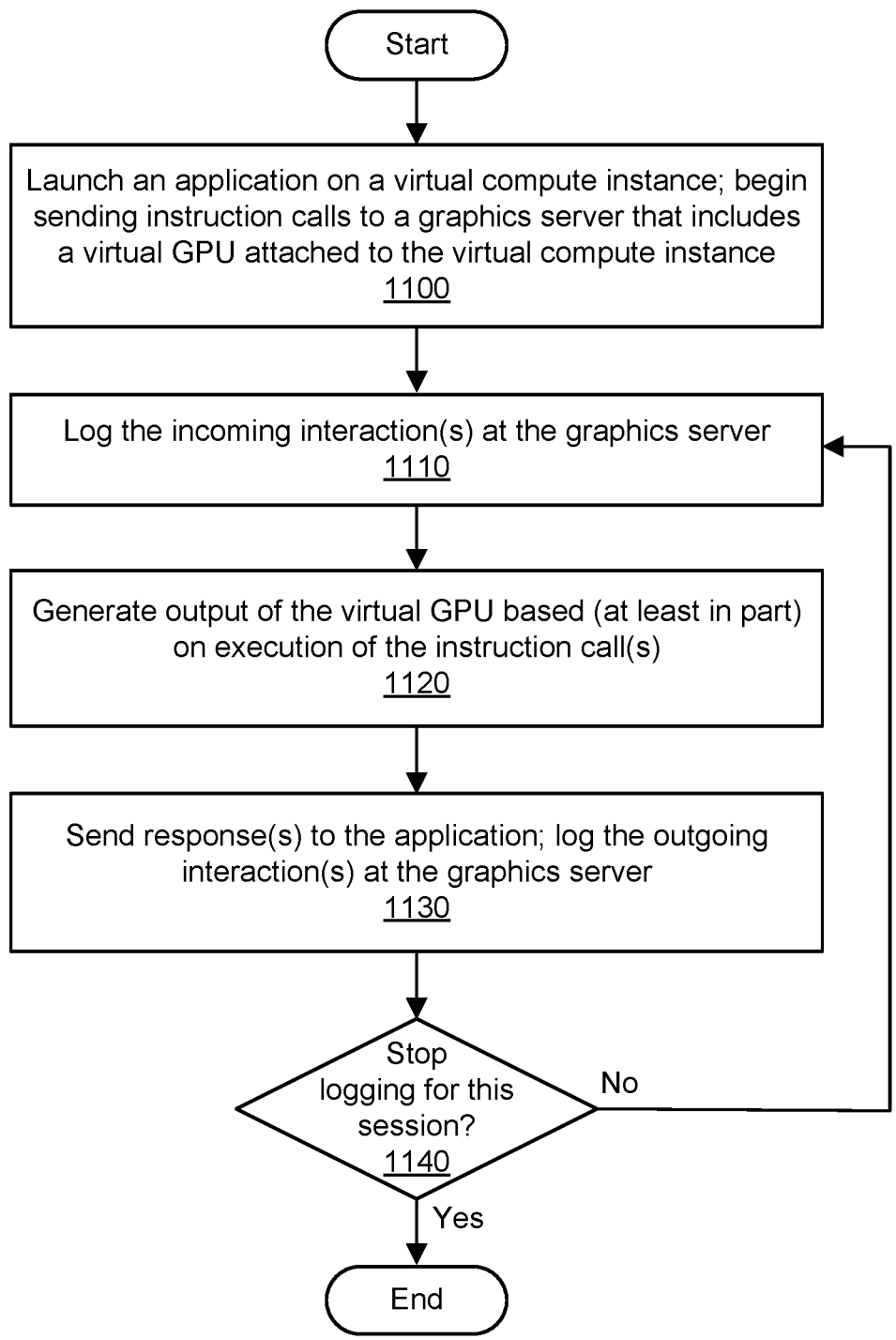
FIG. 11 is a flowchart illustrating a method for interaction monitoring for virtualized graphics processing, according to one embodiment.

FIG. 11 is a flowchart illustrating a method for interaction monitoring for virtualized graphics processing, according to one embodiment. As shown in 1100, an application may be launched on a virtual compute instance with an attached virtual GPU. The virtual compute instance may be implemented using a server, the virtual GPU may be implemented using a physical GPU in a graphics server, and the graphics server may be accessible to the server over a network. Launching the application may also be referred to as initiating execution of the application. During execution, the application may begin sending one or more instruction calls to the graphics server. In various embodiments, the one or more instruction calls may represent API calls associated with a graphics API such as Direct3D or OpenGL and/or API calls associated with a GPGPU API such as OpenCL. The one or more instruction calls may include invocations of functions (e.g., associated with a graphics driver or graphics API) as well as parameters and data associated with particular invocations of functions.

As shown in 1110, the incoming interactions from the application may be logged at the graphics server. In one embodiment, an interaction monitoring component may intercept and log interactions between the application on the virtual compute instance and the virtual GPU on the graphics server. In one embodiment, the interactions that are intercepted and logged are typically routed between the graphics driver that takes calls from the application and the graphics virtual machine that mediates access to the virtual GPU. The interaction monitoring may generate an interaction log that represents a persistent data structure storing the interactions between the application and the virtual GPU. In one embodiment, the interaction log may include one or more of the instruction calls. The log may be associated with a combination of the particular application and the particular virtual GPU. The log may be associated with a particular session for the particular application and the particular virtual GPU. The session may start and stop at any suitable points in time, and the log may include interactions occurring within those points in time.

Upon receipt by the graphics server, the one or more instruction calls may also be executed or otherwise implemented using the virtual GPU. As shown in 1120, output of the virtual GPU may be generated based (at least in part) on execution of the instruction call(s). The virtual GPU output may be provided to a client device, either directly from the virtual GPU or routed through virtual compute instance. In various embodiments, the virtual GPU output may represent graphical or non-graphical output.

The graphics server may also produce one or more responses to at least some (but not necessarily all) of the one or more instruction calls. As shown in 1130, one or more responses may be returned to the application and added to the interaction log. For example, the one or more responses may include status updates in response to status inquiries, acknowledgements of receipt of instructions and/or data, errors generated in attempts to process or implement the one or more instruction calls, and so on. In one embodiment, the instruction calls and responses may be ordered chronologically in the log, e.g., using timestamps based on a clock at the graphics server.

In one embodiment, the session of interaction monitoring may be started and stopped based (at least in part) on input from the application. In one embodiment, the session of interaction monitoring may be started based (at least in part) on launching an application whose vendor has enabled logging, and the session of interaction monitoring may be stopped based (at least in part) on terminating the application. As shown in 1140, it may be determined whether to stop logging for this session of interaction monitoring. If so, then the method may end, and analysis of the log of interactions may potentially be performed within any suitable time frame for potential optimization of the application. If the interaction monitoring session continues, then the method may return to the operation shown in 1110 for logging of additional instruction calls.

Illustrative Computer System

In at least some embodiments, a computer system that implements a portion or all of one or more of the technologies described herein may include a computer system that includes or is configured to access one or more computer-readable media. FIG. 12 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    a server comprising at least one processor and a memory, wherein a virtual compute instance is implemented using the server, and wherein the virtual compute instance is provided by a multi-tenant provider network; and
    a graphics server comprising a physical graphics processing unit (GPU), wherein the graphics server is accessible to the server over a network, wherein a virtual GPU is implemented using the physical GPU and attached to the virtual compute instance over the network, and wherein the virtual GPU is provided by the multi-tenant provider network; and wherein the server is configured to send, over the network to the graphics server, a plurality of instruction calls produced by execution of an application using the virtual compute instance; and
    wherein the graphics server is configured to:
        generate GPU output based at least in part on execution of the one or more instruction calls using the virtual GPU; and
        store a log of interactions between the application and the virtual GPU, wherein the interactions in the log comprise the one or more instruction calls sent to the graphics server and response information resulting from the execution of the one or more instruction calls using the virtual GPU.

2. The system as recited in claim 1, further comprising:
    a profiling service configured to:
        perform programmatic analysis of the log of interactions; and
        based at least in part on the programmatic analysis, generate one or more analytics associated with use of the virtual GPU by the application.

3. The system as recited in claim 1, further comprising:
    a profiling service configured to:
        perform programmatic analysis of the log of interactions; and
        based at least in part on the programmatic analysis, generate a recommendation of one or more modifications to the application.

4. The system as recited in claim 1, further comprising:
    a profiling service configured to:
        replay at least a portion of the instruction calls in the log of interactions.

5. A computer-implemented method, comprising:
    receiving, from a server by a graphics server over a network, one or more instruction calls produced by execution of an application on a virtual compute instance, wherein the graphics server comprises a physical graphics processing unit (GPU), and wherein a virtual GPU is implemented using the physical GPU and attached to the virtual compute instance over the network;
    generating GPU output at the graphics server based at least in part on execution of the one or more instruction calls using the virtual GPU;
    generating a log of interactions between the application and the virtual GPU, wherein the interactions in the log comprise the one or more instruction calls sent to the graphics server and response information resulting from the execution of the one or more instruction calls using the virtual GPU.

6. The method as recited in claim 5, further comprising:
    based at least in part on the log of interactions, generating a profile associated with use of the virtual GPU by the application.

7. The method as recited in claim 5, further comprising:
    performing programmatic analysis of the log of interactions; and
    based at least in part on the programmatic analysis, generating a recommendation of one or more modifications to the application.

8. The method as recited in claim 5, further comprising:
    replaying at least a portion of the instruction calls in the log of interactions.

9. The method as recited in claim 5, further comprising:
    using an additional virtual GPU associated with one or more different hardware characteristics than the virtual GPU, replaying at least a portion of the instruction calls in the log of interactions; and generating a report indicating one or more differences between the execution of the one or more instruction calls using the virtual GPU and execution of the one or more instruction calls using the additional virtual GPU.

10. The method as recited in claim 5, further comprising: storing the log of interactions using an external storage service in one or more storage locations associated with a vendor of the application.

11. The method as recited in claim 5, wherein the interactions in the log comprise one or more responses to the one or more instruction calls, wherein the one or more responses are sent from the graphics server to the virtual compute instance.

12. A non-transitory computer-readable storage medium storing program instructions computer-executable to perform:

receiving, from a server by a graphics server over a network, a plurality of instruction calls produced by execution of an application executing in a virtual compute instance, wherein the graphics server comprises a physical graphics processing unit (GPU), wherein a virtual GPU is implemented using the physical GPU and attached to the virtual compute instance over the network, and wherein the graphics server and the server are provided by a multi-tenant provider network;

generating GPU output at the graphics server based at least in part on execution of the instruction calls using the virtual GPU; and storing a log of interactions between the application and the virtual GPU, wherein the interactions in the log comprise the instruction calls sent to the graphics server and response information resulting from execution of the instruction calls using the virtual GPU.

13. The non-transitory computer-readable storage medium as recited in claim 12, wherein the program instructions are further computer-executable to perform:

based at least in part on the log of interactions, generating one or more analytics associated with use of the virtual GPU by the application.

14. The non-transitory computer-readable storage medium as recited in claim 12, wherein the program instructions are further computer-executable to perform:

based at least in part on the log of interactions, generating a profile of application programming interface (API) commands associated with the instruction calls.

15. The non-transitory computer-readable storage medium as recited in claim 12, wherein the program instructions are further computer-executable to perform:

performing programmatic analysis of the log of interactions; and based at least in part on the programmatic analysis, generating a recommendation of one or more modifications to the application.

16. The non-transitory computer-readable storage medium as recited in claim 12, wherein the program instructions are further computer-executable to perform:

replaying at least a portion of the instruction calls in the log of interactions.

17. The non-transitory computer-readable storage medium as recited in claim 12, wherein the program instructions are further computer-executable to perform:

using an additional virtual GPU associated with one or more different hardware characteristics than the virtual GPU, replaying at least a portion of the instruction calls in the log of interactions; and generating a report indicating one or more differences between the execution of the one or more instruction calls using the virtual GPU and execution of the one or more instruction calls using the additional virtual GPU.

18. The non-transitory computer-readable storage medium as recited in claim 12, wherein the program instructions are further computer-executable to perform:

storing the log of interactions using an external storage service in one or more storage locations associated with a vendor of the application.

19. The non-transitory computer-readable storage medium as recited in claim 12, wherein the interactions in the log comprise one or more responses to the one or more instruction calls, wherein the one or more responses are sent from the graphics server to the virtual compute instance.

* * * * *